US009729362B1

(12) United States Patent
Ralph et al.

(10) Patent No.: US 9,729,362 B1
(45) Date of Patent: Aug. 8, 2017

(54) SYSTEMS AND METHODS FOR AUTONOMOUS SIGNAL MODULATION FORMAT IDENTIFICATION

(71) Applicant: Georgia Tech Research Corporation, Atlanta, GA (US)

(72) Inventors: Stephen Ralph, Atlanta, GA (US); Kedar Mehta, Atlanta, GA (US); Pierre Isautier, Atlanta, GA (US); Andrew Stark, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 48 days.

(21) Appl. No.: 14/221,246

(22) Filed: Mar. 20, 2014

Related U.S. Application Data

(60) Provisional application No. 61/928,234, filed on Jan. 16, 2014, provisional application No. 61/861,743, filed on Aug. 2, 2013, provisional application No. 61/803,515, filed on Mar. 20, 2013.

(51) Int. Cl.
*H04L 27/00* (2006.01)
*H04J 14/06* (2006.01)
*H04B 10/61* (2013.01)
*H04L 7/00* (2006.01)

(52) U.S. Cl.
CPC ..... *H04L 27/0012* (2013.01); *H04B 10/6161* (2013.01); *H04B 10/6164* (2013.01); *H04B 10/6165* (2013.01); *H04J 14/06* (2013.01); *H04L 7/0075* (2013.01)

(58) Field of Classification Search
CPC .... H04L 27/0012; H04L 7/0075; H04J 14/06; H04B 10/6165; H04B 10/6164; H04B 10/6161
See application file for complete search history.

(56) References Cited

U.S. PATENT DOCUMENTS

| | | | | |
|---|---|---|---|---|
| 6,690,746 | B1* | 2/2004 | Sills | G06K 9/00523 375/316 |
| 8,588,344 | B2* | 11/2013 | Ray | H04L 27/2647 375/261 |
| 2004/0204878 | A1* | 10/2004 | Anderson | G06F 19/00 702/66 |
| 2012/0027131 | A1* | 2/2012 | Sethi | H04L 27/2647 375/329 |
| 2014/0307767 | A1* | 10/2014 | Anantha | H04L 27/0012 375/232 |

* cited by examiner

*Primary Examiner* — Leslie Pascal
(74) *Attorney, Agent, or Firm* — Troutman Sanders LLP; Ryan A. Schneider; Christopher C. Close, Jr.

(57) ABSTRACT

Systems and methods for autonomous signal modulation format identification are disclosed. In an example embodiment of the disclosed technology, a method includes applying higher-order statistics to an input signal to identify the input signal's modulation format. The method may include applying higher-order statistics to the input signal to calculate higher-order cumulant values for the input signal as higher-order cumulants are indicative of a particular modulation format signature. The method may further include employing a decision tree to determine the modulation format of the input signal.

15 Claims, 19 Drawing Sheets

| | $\|C_{4,0}\|$ | $\|C_{4,1}\|$ | $\|C_{4,2}\|$ |
|---|---|---|---|
| OOK | 1 | 1 | 1 |
| BPSK | 2 | 2 | 2 |
| QPSK | 1 | 0 | 1 |
| 16-QAM | 0.68 | 0 | 0.68 |

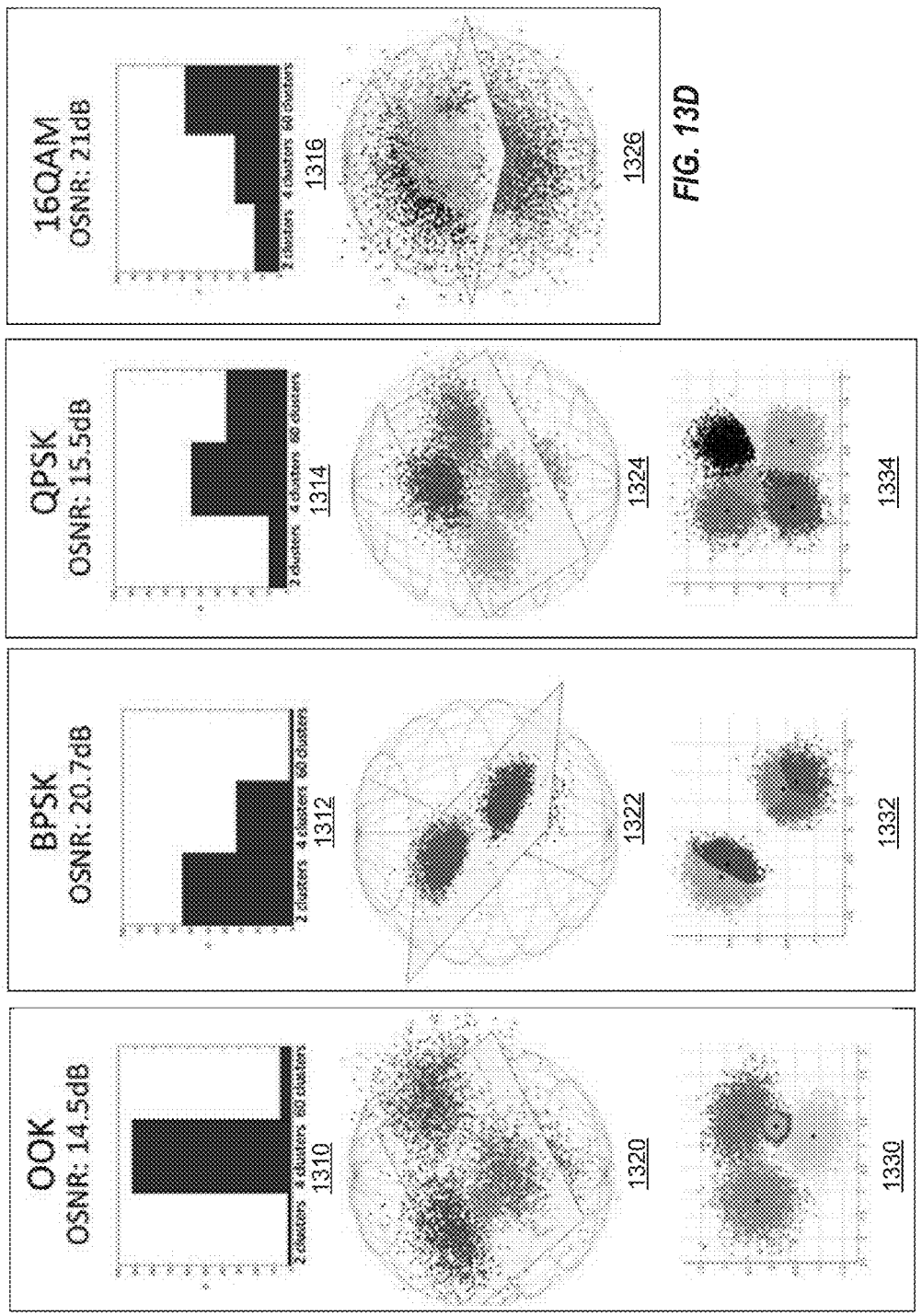

SYSTEMS AND METHODS FOR AUTONOMOUS SIGNAL MODULATION FORMAT IDENTIFICATION

CROSS REFERENCE TO RELATED APPLICATION

This application claims benefit under 35 U.S.C. §119(e) of U.S. Provisional Patent Application Nos. 61/803,515, filed Mar. 20, 2013, entitled "Autonomous Signal Identification and Decoding for Coherent Optical Receivers", 61/861,743, filed Aug. 2, 2013, entitled "Autonomous Software-Defined Coherent Optical Receiver Performing Modulation Format Recognition in Stokes-Space", and 61/928,234, filed Jan. 16, 2014, entitled "Robust Modulation Format Recognition Method in Stokes Space for Autonomous Software-Defined Coherent Optical Receiver Architectures", which are incorporated herein by reference as if set forth herein in their entirety.

BACKGROUND

Software-defined networking (SDN) with flexible grid optical networks is expected to considerably enhance the capacity and fluidity of optical communications. In a typical configuration, coherent receivers are followed by adaptive digital signal processing designed to mitigate impairments and demodulate the received data. But, these architectures generally require critical transmitter and/or channel information be available at the receiver. For example, to function effectively, such architectures depend on the receiver having maximum foreknowledge of a received signal's transmission parameters such as modulation format, symbol rate (i.e., baud rate or modulation rate), and carrier frequency, as well as the number of the multiplexed polarizations and the length of the signal's transmission over fiber and the type of fiber used in the transmission. In many circumstances, however, such foreknowledge is unavailable. Further, because of growing diversity in optical network transportation standards, numerous incompatibilities exist between transceivers, further limiting transceiver flexibility and complicating the process of transmitting and receiving optical signals. Accordingly, a need exists for a receiver that is capable of identifying and decoding a signal without any or all of the typically-required foreknowledge of the signal's parameters.

SUMMARY

Briefly described, and according to one embodiment, aspects of the present disclosure generally relate to systems and methods for autonomously determining the modulation format of input signals. Certain embodiments may include systems or methods for processing an input signal to generate a plurality of estimates of the state of polarization of the input signal; responsive to generating the plurality of estimates of the state of polarization of the input signal, performing polarization scrambling mitigation on the input signal to generate a plurality of polarization demultiplexed signals; estimating the frequency offset of each of the plurality of polarization demultiplexed signals; responsive to estimating the frequency offset of each of the plurality of polarization demultiplexed signals, removing the estimated frequency offset of each of the plurality of polarization demultiplexed signals to generate a plurality of frequency offset-compensated signals; estimating the phase offset of each of the plurality of frequency offset-compensated signals; responsive to estimating the phase offset of each of the plurality of frequency offset-compensated signals, removing the estimated phase offset of each of the plurality of frequency offset-compensated signals to generate a plurality of phase noise-compensated signals; and applying higher-order statistics to each of the plurality of phase noise-compensated signals to identify the modulation format of the input signal.

According to an example embodiment, applying higher-order statistics may include applying higher-order statistics to each of the plurality of phase noise-compensated signals to calculate higher-order cumulant values of each of the plurality of phase noise-compensated signals, wherein higher-order cumulants are indicative of a particular modulation format signature; and responsive to calculating the values, employing a decision tree to determine the modulation format of the input signal.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 13A-D illustrate modulation format recognition using a test system comprising an MFI configured to employ HOS and Stokes space mapping in a back-to-back configuration, according to an example embodiment.

DETAILED DESCRIPTION

Figure 1:
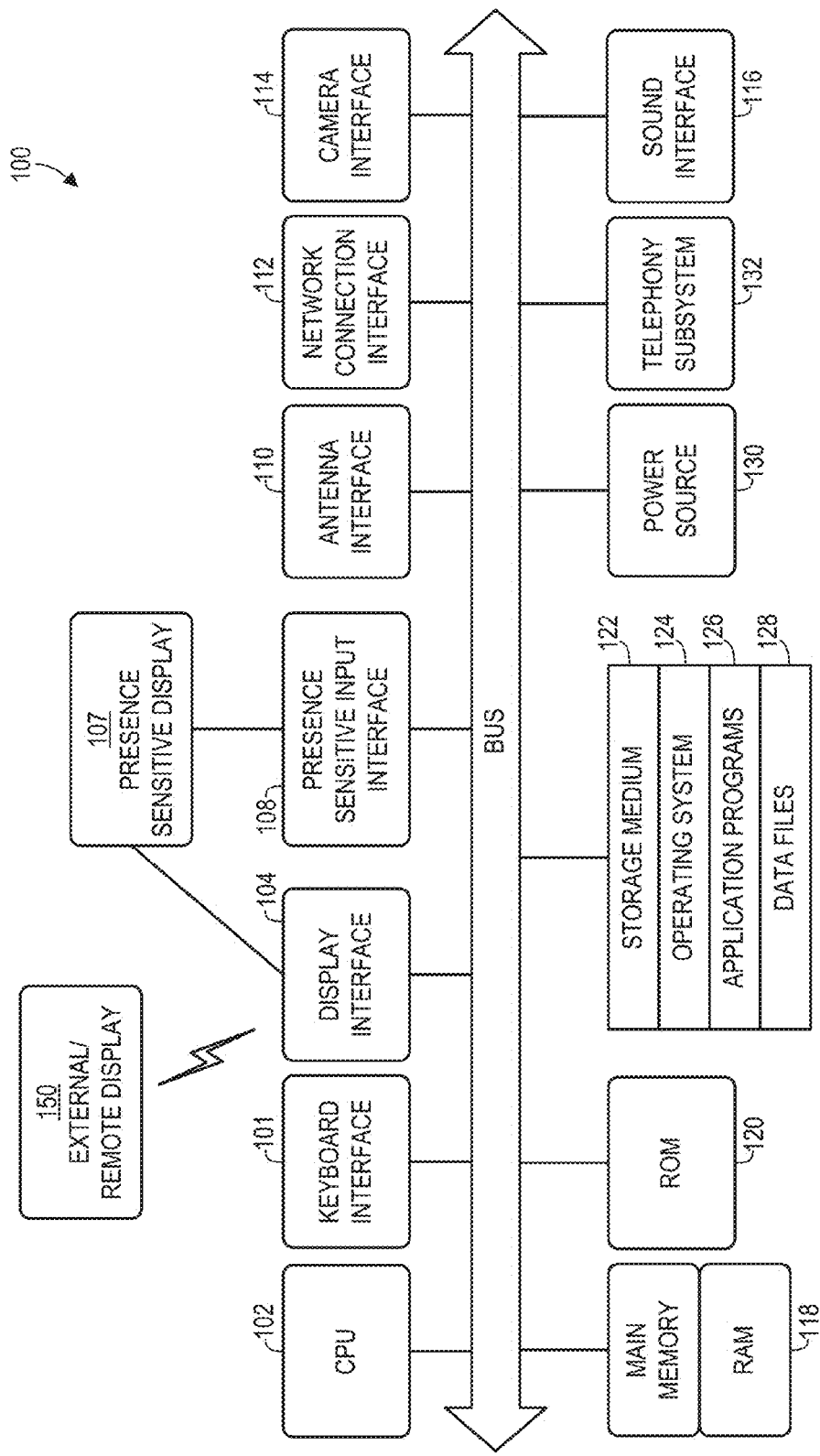
FIG. 1 is a block diagram of an illustrative computer system architecture 100, according to an example embodiment.

Certain embodiments of the disclosed technology provide systems and methods for reliable and robust, fully autonomous estimation of transmission parameters of a received signal such as baud rate, chromatic dispersion, and state of polarization. Further, embodiments of the disclosed technology provide systems and methods for autonomous identification and detection of signal transmission parameters and signal formats such as OOK, BPSK, QPSK, 16-QAM, M-QAM, M-PSK, and M-PAM. Finally, embodiments of the disclosed technology provide systems and methods for optimally decoding received signals. In one embodiment, the disclosed systems and methods may be incorporated in the adaptable receivers, which may allow for the dynamic optimization of bandwidth demands coupled with the use of heterogeneous modulation formats on gridless optical networks.

In one embodiment, the receiver blindly receives a signal, which may have been transmitted via a wireless, optical, or wired channel. In blindly receiving the signal, the receiver receives the signal with no foreknowledge of the signal's transmission parameters. Alternatively, the receiver receives a signal with foreknowledge of one or more transmission parameters.

In one embodiment, the receiver is a digital coherent optical receiver comprising an optical hybrid wherein a local optical signal is mixed with the received optical signal. The resulting mixed signal is then split into four components representing orthogonal optical polarizations and orthogonal phases of the optical carrier. Typically, an embedded high-speed photodiode converts each of the signals to an electronic signal, and an analog-to-digital converter then samples the electronic signals to acquire samples that make up an input signal. In various embodiments, an input signal may comprise no useful information relating to transmission parameters. Further, as will be understood by one of skill in the art, it is common for a receiver to receive control signals comprising useful information relating to transmission parameters; however, in many instances, control signals may comprise no useful information relating to transmission parameters. Subsequently, a digital signal processing (DSP) module processes the input signals using a variety of digital DSP methods, as will be discussed herein.

Further, in one embodiment, the optical receiver, and the DSP module in particular, comprises an autonomous processing module (APM) comprising an architecture that operates in a serial fashion on input signals and enables autonomous or blind signal modulation format identification. In particular, an APM typically operates blindly on input signals with no foreknowledge of total accumulated chromatic dispersion, baud rate, number of multiplexed polarizations, modulation format, or other transmission parameters. In one embodiment, upon receipt of the input signals, an APM processes the input signals to autonomously retrieve the received optical signal's transmission parameters. Further, once a signal's parameters are determined, the optical receiver decodes the received optical signals with performance equivalent to a traditional optical receiver, according to one embodiment.

According to one embodiment, the architecture of an APM may be divided into two consecutive, complementary modules for processing input signals. In one implementation, a first module receives an input signal (i.e., input data) and detects the input signal's transmission parameters (e.g., symbol rate, chromatic dispersion, state of polarization, etc.) as well as the input signal's modulation. A second module then robustly demodulates the input data through an optimized set of algorithms chosen according to the parameters extracted and format recognized by the first module.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that embodiments of the disclosed technology may be practiced without these specific details. In other instances, well-known methods, structures and techniques have not been shown in detail in order not to obscure an understanding of this description. References to "one embodiment," "an embodiment," "example embodiment," "various embodiment," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example embodiments of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes and a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
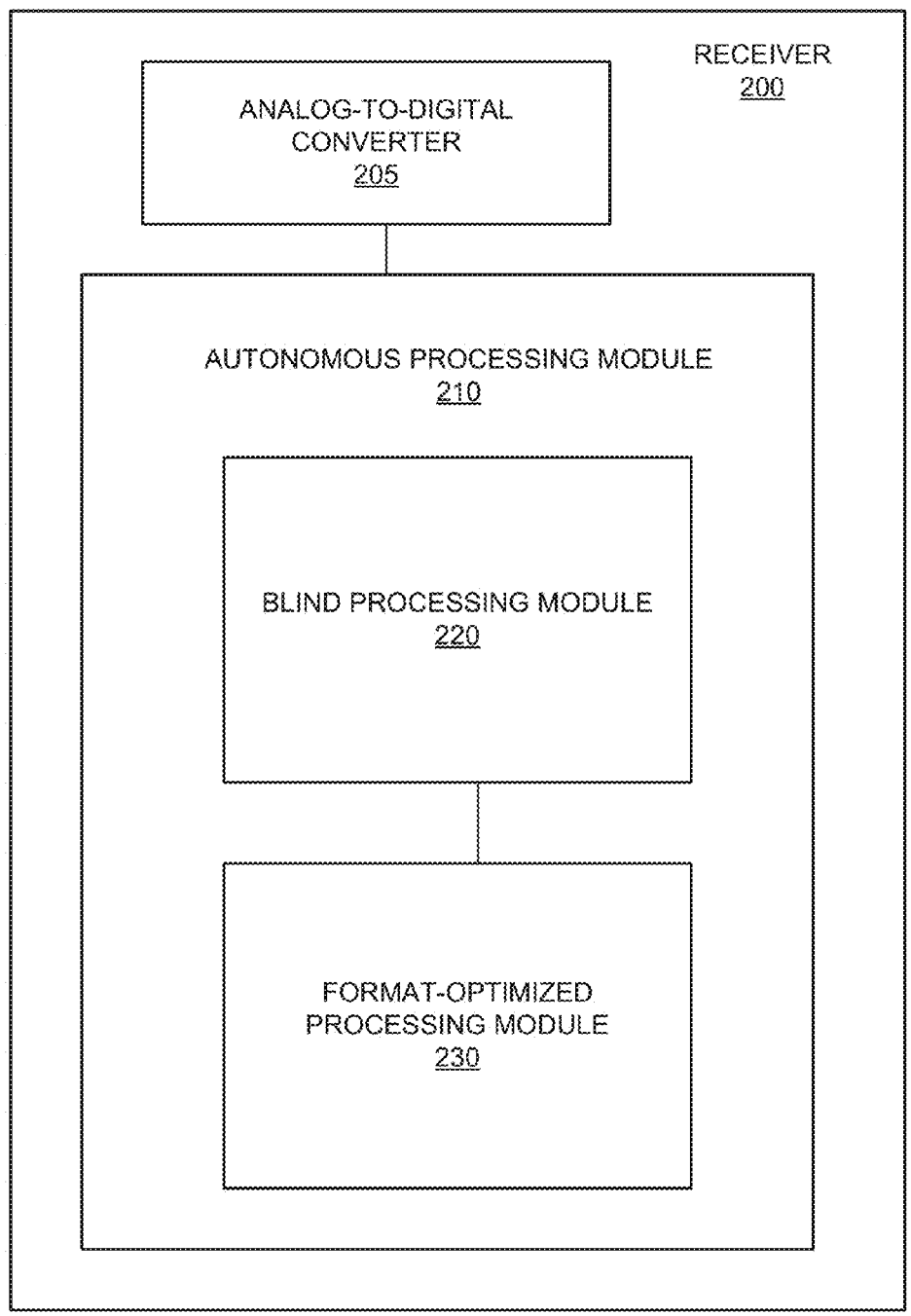
FIG. 2 is a block diagram of a receiver 200 comprising an autonomous processing module (APM) 210, according to an example embodiment.

As noted, aspects of the present disclosure generally relate to systems and methods for autonomous or blind demodulation of received signals. In one embodiment, a receiver may employ an autonomous processing module (APM) to implement the disclosed systems and methods. The architecture of an APM may comprise various processing modules for implementing various algorithms and processes used in agnostic demodulation. In one embodiment, the processing modules may be grouped into a blind processing module and a format-optimized processing module, which are operatively connected and may implement certain algorithms and processes related to agnostic identification and demodulation. FIG. 2 illustrates an example receiver 200 comprising an APM 210, which further comprises a blind processing module 220 and a format-optimized processing module 230, which will be described in further detail below. In one embodiment, the example receiver 200 may include some or all of the computing device 100 shown in FIG. 1 or may be in operative communication with the computing device shown in FIG. 1. Further, in one embodiment, the receiver 200 may comprise an analog-to-digital converter 205 for processing the received signal, as will be understood by one of skill in the art. In one embodiment, an analog-to-digital converter 205 may comprise an optical-to-electrical converter and a digitizer (e.g., electrical digitizer). In one embodiment, an analog-to-digital converter 205 may first optically sample a signal, then convert the signal from an optical signal to an electrical signal, which is the analog-to-digital converter 205 then digitizes.

After the received signal is converted to an input signal by an analog-to-digital converter, according to one embodiment, the input signal is processed by the various submodules of the APM 210, as described below.

Blind Processing Module:

In one embodiment, as shown in FIG. 2, an APM 210 comprises a blind processing module 220. As shown in FIG.

3, a blind processing module 220 may comprise a baud rate estimator 305, a chromatic dispersion compensator 310, a timing recovery module 315, a polarization multiplexing state estimator (PMSE) 320, and a modulation format identifier 330. As further shown in FIG. 3, the blind processing module 220 is operatively connected to the format-optimized processing module 230, according to one embodiment.

Baud Rate Estimator

As noted, according to one embodiment, a blind processing module 220 comprises a baud rate estimator (BRE) 305 for autonomously determining the baud rate of the received signal. Generally, classic baud rate estimators are not well-suited for optical receivers. Therefore, in one embodiment, a BRE 305 employs a weighted version of a classical baud rate estimator. The weighted baud rate estimator estimates the baud rate (i.e., signal rate) by exploiting the fact that the input signal is cyclostationary and further assuming that the baud rate is the input signal's only non-zero positive cyclic frequency. Structured data streams may present additional non-zero positive cyclic frequencies; however, the baud rate will necessarily be higher, as will be understood by one of skill in the art. The estimate of the cyclic-correlation at frequency $\alpha$ and delay $\tau$ is given by:

$$\hat{r}_T^{(\alpha)}[\tau] = \frac{1}{T}\sum_{n=0}^{T-1} x[n+\tau]\bar{x}[n]e^{2j\pi\alpha n} \quad (1)$$

where:
x[k] is the received data sequence;

$$\alpha = \frac{f}{f_s}$$

is the normalized frequency;
$f_s$ is the sampling frequency;
T is the number of samples in the block of samples processed.

The classical cyclic-correlation estimation vector at frequency $\alpha$ over the range of delays $\tau\in[0:2N]$ is given by:

$$\hat{R}_T^{(\alpha)} = [\hat{r}_T^{(\alpha)}[0] \ldots \hat{r}_T^{(\alpha)}[2N]] \quad (2)$$

Accordingly, the weighted version of the classical estimator $\hat{R}_T^{(\alpha)}$ is given by:

$$\hat{S}_T^{(\alpha)} = \Gamma(\alpha)^{-1/2}\hat{R}_T^{(\alpha)} \quad (3)$$

In the weighted estimator, $\Gamma(\alpha)$ is the asymptotic covariance matrix of the classical estimator $\hat{R}_T^{(\alpha)}$ in which, according to one embodiment, coefficient (i,j) of $\Gamma(\alpha)$ is estimated by:

$$[\Gamma(\alpha)]_{i,j} = z_1^{(\alpha)} * z_{2\_}[j-i] \text{ for } i,j\in[0:2N] \quad (4)$$

with:

$$z_1^{(\alpha)}[n] = w[n]\overline{\hat{r}_T^{(0)}[n]}e^{2\pi j\alpha(n-1)} \quad (5)$$

$$z_2[n] = w[n]\hat{r}_T^{(0)}[n] \text{ for } n\in[1:L] \quad (6)$$

where:

$$z_{2\_}[n] = z_2[-n] \quad (7)$$

and where:

$$W[n] = [w[1] \ldots w[L]]^t : \text{Blackmon window of length } L=8N+1 \quad (8)$$

Further, according to one embodiment, the normalized baud rate, $$\alpha = \frac{f_{symbol}}{f_s},$$

can be estimated by the maximization problem:

$$\hat{\alpha}_0 = \arg\max_{\alpha\in]0,1/2[} \|\hat{S}_T^{(\alpha)}\|^2 \quad (9)$$

Further still, in one embodiment, to improve the robustness of the BRE 305, the BRE 305 may perform a coarse estimation and compensation of the chromatic dispersion (as is discussed in the section immediately following) to mitigate the impact of chromatic dispersion suffered by the optical wave during transmission prior to baud rate estimation. The coarse estimation and compensation of the chromatic dispersion may follow a time-domain implementation of a chromatic dispersion compensator 310, which will be discussed in the section immediately following. In one embodiment, this coarse estimation and compensation of chromatic dispersion is followed by a resampling process such that $$\frac{f_{symbol}}{f_s} < \frac{1}{4},$$

which is then followed by the baud rate estimation, as described.

Though the BRE 305 may roughly mitigate the accumulated chromatic dispersion for purposes of identifying the baud rate, a chromatic dispersion compensator 310 precisely estimates and compensates the signal's chromatic dispersion, as will be discussed below.

Chromatic Dispersion Compensator

Figure 3:
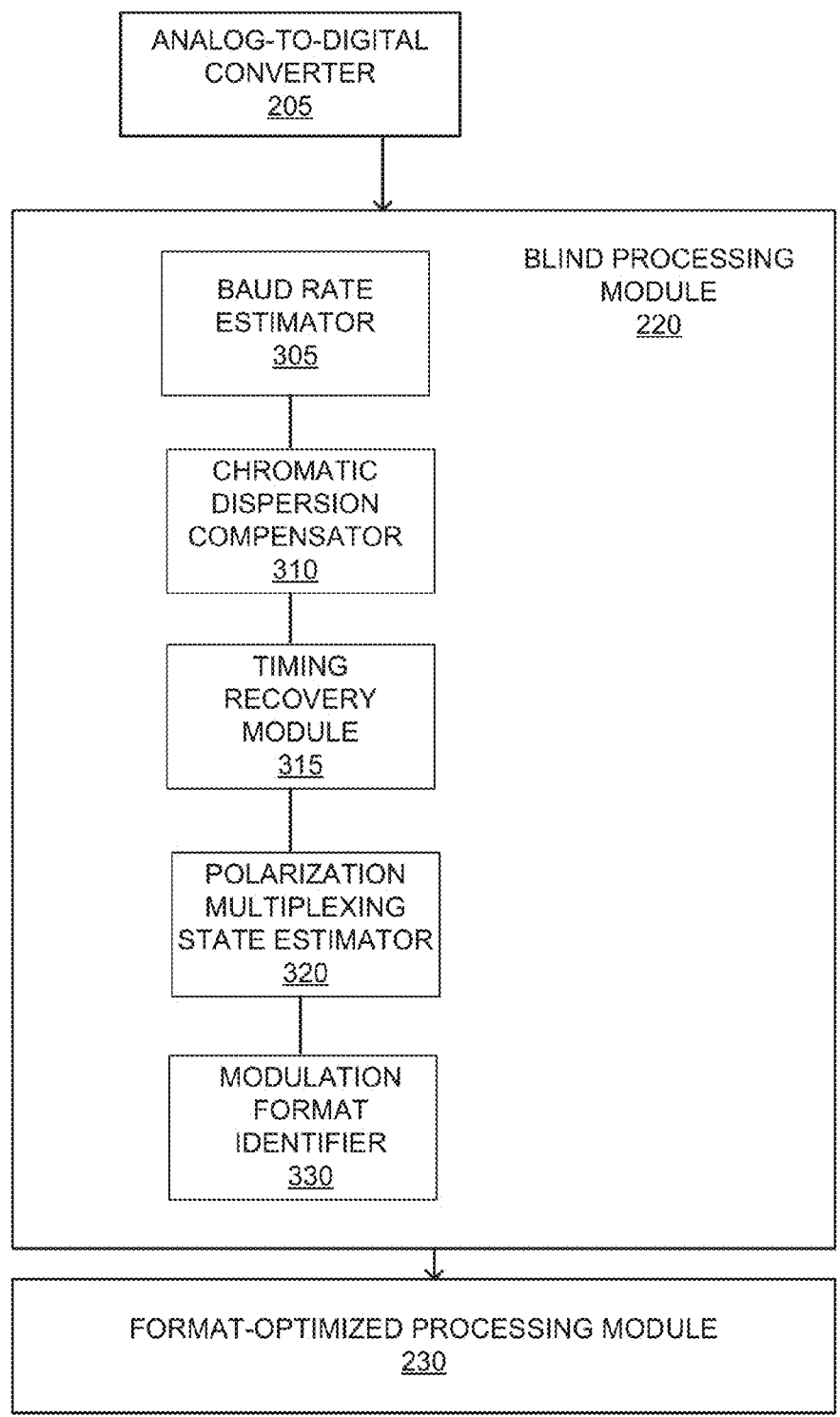
FIG. 3 is a block diagram of a blind processing module 220, according to an example embodiment.

According to one embodiment, and as shown in FIG. 3, a blind processing module 220 may further comprise a chromatic dispersion compensator (CDC) 310 to precisely estimate and compensate a signal's chromatic dispersion (CD). In one embodiment, the CDC 310 estimates the total accumulated CD, and then the CDC 310 compensates (i.e., equalizes) the estimated total accumulated CD. In one embodiment, the processes performed by a CDC 310 are performed blindly (i.e., without foreknowledge of a signal's transmission parameters).

Generally, correction of first order dispersion is sufficient for most fiber links. Accordingly, the frequency domain transfer function of a CD compensating filter may be given by:

$$G(z,\omega) = \exp\left(-j\frac{Dz\lambda^2}{4\pi c}\omega^2\right) \quad (10)$$

where:

z is the total length of the fiber in which the optical signal is transmitted;

λ is the carrier wavelength;

c is the speed of light;

D is the chromatic dispersion coefficient of the optical fiber.

For fiber systems comprising different spans of different fiber including dispersion-compensating fiber, equation (10) may be applied to the overall link. To blindly estimate the total accumulated CD (i.e., the effective Dz product), the CDC 310 may use a method based on the principle that the optimally compensated signal has minimum amplitude variance. Accordingly, in one embodiment, after separately compensating both polarizations of the signal, the CDC 310 evaluates an error criterion, which is based on the signal's variance, with different trial values of CD. These trial values of CD span a broad range using a step size that can be dynamically adjusted. In one embodiment, the estimated total accumulated CD is determined when the corresponding compensated optical signal exhibits minimum variance (i.e., when the error criterion reaches its minimum or when the corresponding compensated optical signal has minimum bit rate error) because it has been shown that minimum variance corresponds to minimum BER, which will be understood by one of skill in the art. Further discussion of methods for blindly estimating the accumulated CD are discussed in M. Kuschnerov et al. *Adaptive Chromatic Dispersion Equalization for Non-Dispersion Managed Coherent Systems*, presented at OSA/OFC/NFOEC 2009.

As will be understood, after the CDC 310 estimates the accumulated CD, the CD compensation can be processed in the time domain or in the frequency domain. CD compensation filter size depends on total accumulated CD (corresponding delay spread), estimated above, as well as the symbol rate as estimated by the BRE 305. For example, for large values of accumulated CD, frequency domain equalization shows considerable advantages over time domain equalization in terms of computational complexity. Accordingly, in one embodiment, the CDC 310 may employ an overlap frequency domain equalization method based on CD compensation in the frequency domain of overlapping block data. Similar methods are discussed in R. Kudo, et al., *Coherent Optical Single Carrier Transmission Using Overlap Frequency Domain Equalization for Long-Haul Optical Systems*, Journal of Lightwave technology, Vol. 27, No. 16, 2009.

Timing Recovery Module

As discussed, in one embodiment, a receiver may receive a signal with no foreknowledge of the transmitted signal's transmission parameters. Accordingly, because there is no timing reference, the received signal may necessarily be processed asynchronously, thus yielding an input signal comprising non-idealized samples (i.e., samples that were not acquired at the ideal moment). Demodulation, however, typically requires that data be processed synchronously. Accordingly, autonomous modulation format recognition may require that timing recovery be performed on the input signal by a Timing Recovery Module (TRM) 315 to synchronize the receiver clock with the received data stream. In one embodiment, a TRM may process a signal to generate a timing-recovered signal, which may comprise a plurality of optimally-sampled symbols.

In one embodiment, a TRM 315 may employ a digital filter and square timing recovery algorithm to retrieve the timing phase error and the optimal sampling instant. This algorithm may extract an integer number of samples per symbol for both polarizations of the received signal. For example, if two samples are chosen per symbol, one sample may be chosen at maximum eye opening and the other may be chosen one-half a symbol period apart. The discrete sequence of the filtered and squared input signal contains a spectral component at the baud rate estimated by the BRE 305. So, in one embodiment, the TRM 315 measures this frequency component, which allows the TRM 315 to determine the timing phase error and the optimal sampling instant. Within the $n^{th}$ symbol, the optimal sampling instant is given by:

$$t_{opt}[n]=T_s(n+E[\hat{\epsilon}])  \quad (11)$$

where:

$T_s$ is the symbol period;

$\hat{\epsilon}$ is the estimator comprising the normalized phase error and the maximum eye opening localization in the symbol;

$E[\hat{\epsilon}]$ is the expectation of the estimator $\hat{\epsilon}$.

The estimator $\hat{\epsilon}$ is given by:

$$\hat{\epsilon} = -\frac{1}{2\pi}\arg\left(\sum_k s[k]e^{\frac{2\pi jk}{N}}\right) \quad (12)$$

where:

s[k] is the discrete sequence of the filtered and squared input signal;

N is the number of samples in the block of data samples processed.

Algorithms are discussed in M. Oerder, H. Meyr, Digital Filter and Square Timing Recovery, *IEEE Trans. On Comm.*, Vol. 36, No. 5, 1988.

Polarization Multiplexing State Estimator

In one embodiment, an optical receiver and APM 210 can be configured to assume that the received signal was transmitted on both of the orthogonal polarizations. But, before an APM 210 or blind processing module 220 can determine an input signal's modulation format, it may be necessary to estimate whether the transmitter performed polarization multiplexing on the input signal (i.e., determine the number of multiplexed polarizations). In one embodiment, a Polarization Multiplexing State Estimator (PMSE) 320 performs such processing.

In one embodiment, a PMSE 320 can estimate the number of distinct multiplexed polarizations by operating a cross correlation between the X and Y polarization. Accordingly, if the cross correlation signal displays a maximum at lag zero and several symmetric secondary maxima, it can be assumed that the received signal (and, accordingly, the input signal) is single-polarized. If, however, the cross correlation signal displays low peaks for non-zero lags, the signal is dual-polarized (i.e., the signal comprises distinct signals on each of a first and second polarization). Accordingly, in one embodiment, prior to identifying the signal's modulation format, it may be necessary to perform further processing, which may include estimating the signal's SOP and performing polarization scrambling mitigation (i.e., polarization demultiplexing), as will be discussed herein.

Modulation Format Identifier

Typically, despite the processing performed by the BRE 305, CDC 310, TRM 315, and PMSE 320, an APM 210 or blind processing module 220 cannot determine the modulation format of the input signal without further processing. In particular, the received polarizations may not possess the same basis as the transmitted polarizations. Additionally, because the transmitter lasers and receiver lasers (i.e., local oscillators or LO lasers) may not be frequency locked, the constellation is spinning over time (in both polarizations), i.e., there is an additional time-dependent phase, which necessitates further processing to reduce spin prior to determining the modulation format. Accordingly, as will be discussed herein, a Modulation Format Identifier (MFI) 330 may employ various novel methods for identifying modulation formats of input signals. Further, depending on the method utilized for identifying the modulation format, an MFI 330 may employ varying polarization demultiplexing techniques for demultiplexing or sub-optimally demultiplexing the input signal. In one embodiment, and as will be discussed, an optimized polarization demultiplexer is part of a format-optimized processing module 230. According to one embodiment and as will be discussed, after identifying the modulation format, an APM 210 may employ a format-optimized processing module 230 for demodulating the input signal. In one embodiment, after a blind processing module 220 determines an input signal's transmission parameters (e.g. baud rate, total accumulated chromatic dispersion, number of multiplexed polarization, modulation format), reevaluation of transmission parameters may be done in parallel or on an as-needed basis. Accordingly, and as will be appreciated, an APM 210 or blind processing module 220 may not necessarily need to perform processes associated with the BRE 305, the CDC 310 (e.g., estimation of the CD), the PMSE 302, and the MFI 330, thus allowing the APM 210 to focus on the demodulation of the input signal once transmission parameters have been estimated or identified.

Modulation Format Recognition Using
Higher-Order Statistics

In one embodiment, an MFI 330 may employ higher-order statistics (HOS) to determine an input signal's modulation format. In one embodiment, however, before determining the input signal's modulation format using HOS, it may be necessary to further process the signal to estimate the signal's state of polarization (SOP). In one embodiment, an MFI 330 may estimate a signal's SOP by performing a set of blind polarization demultiplexing methods, which may include sub-optimal blind polarization demultiplexing methods. Further, an MFI 330 may perform polarization scrambling mitigation by performing the set of blind polarization demultiplexing methods. In one embodiment, at this stage, an MFI 330 may perform SOP estimation and polarization scrambling mitigation using one or more algorithms similar to an asynchronous constant modulus algorithm (CMA), which may serve as a compromise for demultiplexing various modulation formats (e.g., OOK, BPSK, QPSK, 16-QAM). A similar algorithm for SOP estimation and polarization demultiplexing (i.e., unscrambling) is discussed at K. Kikuchi, *Polarization-demultiplexing algorithm in the digital coherent receiver*, LEOS Summer Topicals, pp. 101-102, July 2008. In one embodiment, performing standard or sub-optimized polarization demultiplexing may yield a plurality of signals (e.g., a plurality of polarization demultiplexed signals), which may be further processed by the MFI 330.

As noted above, in certain embodiments, prior to determining modulation format, it is necessary to reduce the spin of the constellations because the constellation is spinning in time due to the transmitter and receiver (LO) lasers not being frequency locked, which may lead to a residual frequency offset component $\Delta\omega$ in the input signal phase. This processing may comprise estimating and removing the frequency offset between the transmitter and the LO laser from the signal as well as performing carrier phase recovery (i.e., estimating and removing phase noise (e.g., carrier and/or LO phase noise)). In one embodiment, an MFI 330 may perform modified or sub-optimized versions of the processes performed by a frequency offset estimator and phase noise estimator, which will be further described herein.

According to one embodiment, one or more algorithms can be associated with each of a predefined set of modulation formats (e.g., OOK, BPSK, QPSK, and 16-QAM). By exploiting the fast Fourier transform of the input signal raised to a power (e.g., the fourth power), in certain embodiments, the MFI 330 can estimate and remove (or compensate for) the frequency offset between the transmitter and the LO laser for various modulation formats (e.g., OOK, BPSK, QPSK, and 16-QAM). In one embodiment, this processing may yield a plurality of frequency offset-compensated signals.

Because the frequency offset estimation may be imperfect (i.e., the processing compensates for the frequency offset as opposed to completely removing it), and due to random phase offset between the transmitter and the laser, the constellations may still rotate in time. Accordingly, it may be necessary to recover the random phase fluctuation between the transmitter and the LO laser. For example, in one embodiment, after the MFI 330 estimates the frequency offset, the MFI 330 may apply an algorithm such as the Viterbi-Viterbi algorithm to the output in one polarization. In one embodiment, the MFI 330 may apply one or more algorithms (e.g., the Viterbi-Viterbi algorithm) to the plurality of frequency offset-compensated signals, which returns estimates of the phase offset. According to one embodiment, first estimates is achieved by averaging the phase offset in the plurality of frequency offset-compensated signals raised to a predetermined first power (e.g, power four), and second estimates are achieved by averaging the phase offset in the plurality of frequency offset-compensated signals raised to a predetermined second power (e.g. power two). In one embodiment, the first and second estimates of the phase offset are removed from the plurality of frequency offset-compensated signals' phases, thereby yielding a plurality of phase noise-compensated signals, which may be represented by $x_n[k]$.

Figure 4A:
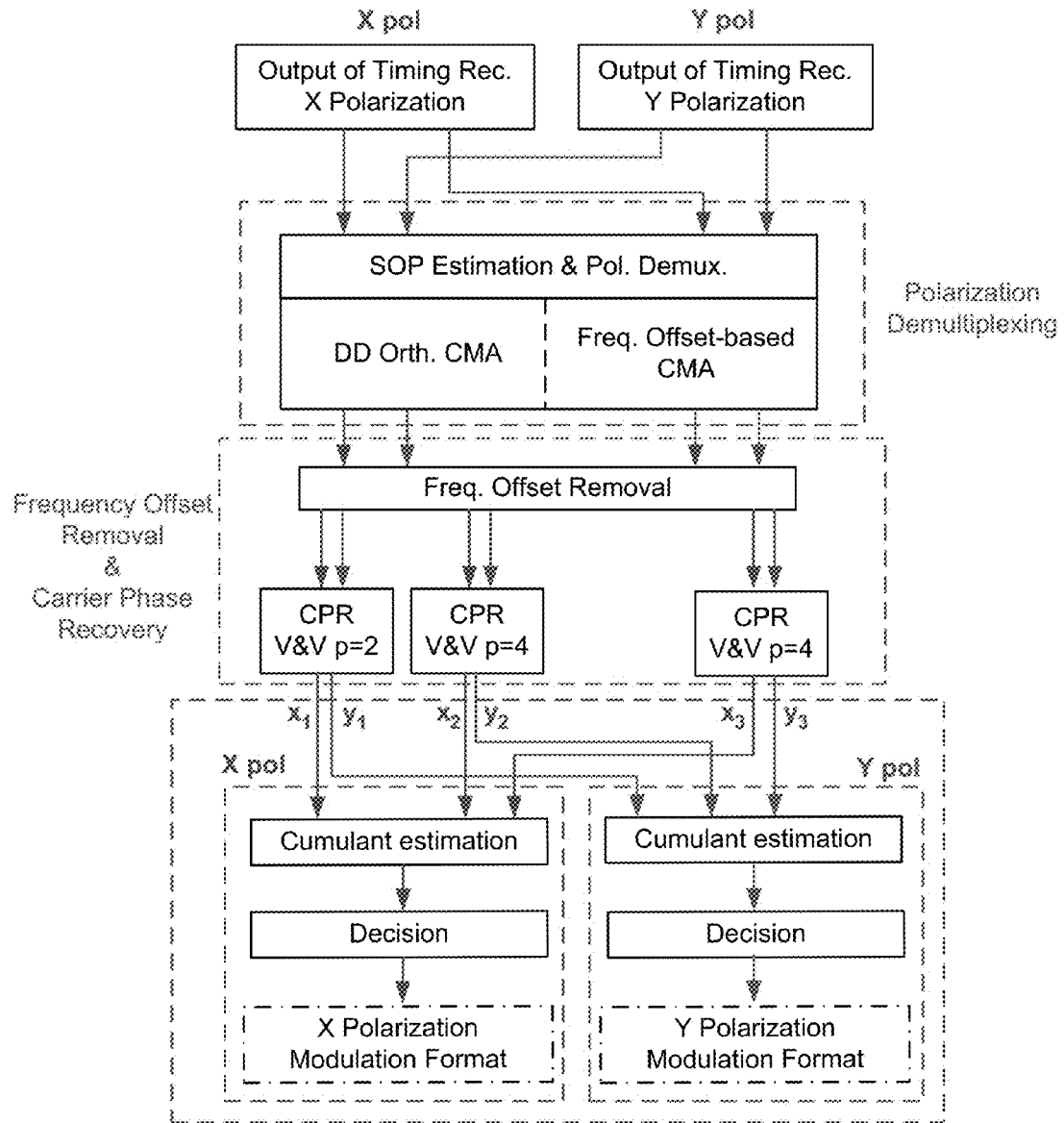
FIG. 4A is a block diagram of an illustrative process for modulation format identification using higher-order cumulants, according to an example embodiment.
Figures 4B, 4C:
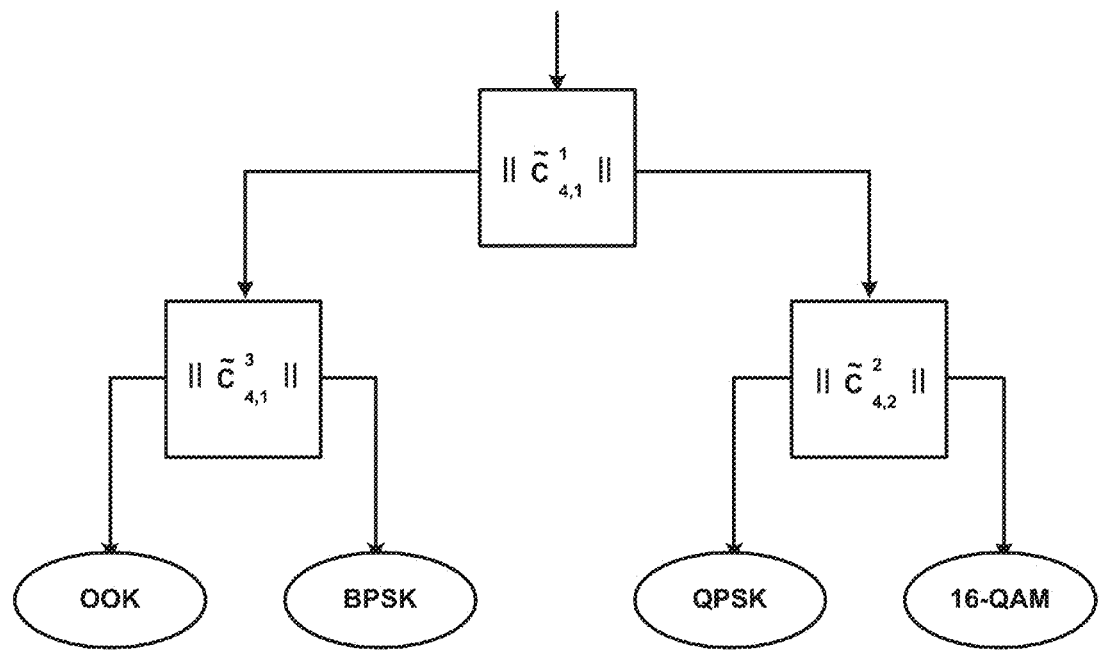
FIG. 4B illustrates a hierarchical structure for modulation format recognition using higher order cumulants, according to an example embodiment.
FIG. 4C illustrates theoretical fourth-order cumulant values indicative of modulation format signatures, according to an example embodiment.

In one embodiment, the MFI 330 may apply higher-order statistics (e.g., fourth-order statistics, fifth-order statistics, etc.) to phase noise-compensated signals $x_n[k]$. For example, as will be understood by one of skill in the art, $\hat{C}_{4i}"$ is the normalized estimator of the normalized fourth-order cumulant $\hat{C}_{4i}"$ of the signal $x_n[k]$ with i=0, 1, 2. For example, in one embodiment, the MFI 330 may employ a processing structure similar to that shown in FIG. 4A. Further, in one embodiment, for discriminating the possible modulation format among BPSK, OOK, QPSK, and 16-QAM, the MFI 330 may employ the hierarchical structure (i.e., decision tree) shown in FIG. 4B. As will be understood and appreciated, cumulants take specific values according to a signal's modulation format. In particular, certain fourth-order cumulants are indicative of particular modulation formats. Accordingly, by applying a fourth-order cumulant to a particular phase noise-compensated signal, it is possible to calculate one or more values of fourth-order cumulants of the particular phase noise-compensated signal. In one embodiment, the calculated values of one or more fourth-order cumulants are indicative of a particular modulation format signature. For example, FIG. 4C shows the theoretical fourth-order cumulant values indicative of modulation format signatures for BPSK, OOK, QPSK, and 16-QAM. Accordingly, by employing a decision tree that incorporates appropriate cumulants (e.g., the appropriate fourth-order cumulants), the MFI 330 can distinguish the modulation format of the input signal.

Because the CMA-based polarization scrambling mitigation described above typically is not ideal for constellations that do not have constant modulus, in certain embodiments, it may be necessary to perform an optimized demodulation after the MFI 330 determines the modulation format. Accordingly, in one embodiment, once the MFI 330 determines the modulation format, the input signal may be further processed by a format-optimized processing module 230 to demodulate the input signal, as is discussed below.

Hybrid Modulation Format Recognition Using HOS and Stokes Space Mapping

In one embodiment, an MFI 330 may employ a combination of Stokes space mapping and HOS to determine an input signal's modulation format. As will be appreciated, there are advantages to performing modulation format recognition in Stokes space. For example, by using a Stokes space-based method, the blind format identification and the subsequent optimized demodulation are performed in a serial fashion and no processing steps require repetition, thus reducing the overall processing load on the APM 210.

Further, an architecture incorporating Stokes space-based format recognition is highly adaptable. The format-optimized processing module 230 generally requires that the recognized modulation format constellation be specified to direct decisions in the demodulation flow. But, because the blind processing module 220 can perform on and identify numerous modulation formats, the format-optimized processing module 230 can be configured with a single architecture because it has foreknowledge of the modulation format from the blind processing module 220.

Additionally, as will be appreciated, Stokes space analysis possesses a high digital signal processing (DSP) potential as it can be used for polarization demultiplexing but also for performing modulation format identification. In particular, as will be discussed, Stokes space mapping leads to the estimation of the inverse Jones matrix necessary to align transmitted and received polarizations. Also, Stokes space mapping reveals a constellation's signature, which allows for modulation format identification. Because Stokes space polarization demultiplexing and Stokes space modulation format recognition are independent processes, they can be performed in parallel. As will be appreciated, this yields two advantages: Stokes space analysis reduces the architecture processing time, and modulation format recognition can be performed occasionally, to monitor the received modulation format of the input signal, contributing to a reduction of the data buffering.

Further, by performing modulation format recognition in Stokes space, it is possible to bypass polarization demultiplexing because the Stokes space constellation is independent of the received state of polarization, and variation of the received state of polarization will merely cause the Stokes space constellation to rotate with time, which is less problematic as will be understood by one of skill in the art.

Finally, the Stokes space mapping process is independent of any residual carrier-LO frequency contained in the received signal.

Accordingly, in one embodiment, after the input signal is processed by the PMSE 320, the output is then mapped to the 3-dimensional Stokes space. Further information relating to mapping of signals into 3-dimensional Stokes space is disclosed in B. Szafraniec et al., *Polarization Demultiplexing in Stokes space*, Optics Express, Vol. 18, No. 17 (2010). As will be understood by one of skill in the art, the 4-dimensional Stokes space vector is given by:

$$S = \begin{pmatrix} s_0 \\ s_1 \\ s_2 \\ s_3 \end{pmatrix} \quad (13)$$

The component $s_0$ corresponds to the signal power, and the sub-vector $\hat{s}=(s_1\ s_2\ s_3)^T$ is taken into account when mapping of the signals to the 3-dimensional Stokes space. According to one embodiment, the components $s_1\ s_2\ s_3$ of the sub-vectors can be expressed in terms of the received signal after digitization.

According to one embodiment, E(t) represents the electric field component of the received optical signal, and x[k] & y[k] represent the received electrical signals after digitization, CD equalization, timing recovery, and normalization. Accordingly, when $$E(t) = \begin{pmatrix} E_x(t)e^{j(\Delta\omega t + \phi_x(t))} \\ E_y(t)e^{j(\Delta\omega t + \phi_y(t))} \end{pmatrix} \quad (14)$$

$$\begin{pmatrix} x[k] \\ y[k] \end{pmatrix} = \frac{1}{\sqrt{2}} \begin{pmatrix} a_x[k]e^{j(\Delta\omega k + \phi_x[k])} \\ a_y[k]e^{j(\Delta\omega k + \phi_y[k])} \end{pmatrix} \quad (15)$$

where:
$E_x(t)$, $E_y(t)$ are the amplitude of the electric field in the X and Y polarizations;
$\Delta\omega$ is the residual frequency offset;
$\phi_x(t)$, $\phi_y(t)$ are the phase components of the electric field in the X and Y polarizations;
$a_x[k]$, $a_y[k]$ are the amplitude of the received electrical signals after digitization;
$\phi_x[k]$, $\phi_y[k]$ are the digitized phase components of the electric field in the X and Y polarizations;
the components $s_1\ s_2\ s_3$ can be expressed as:

$$\begin{pmatrix} s_1[k] \\ s_2[k] \\ s_3[k] \end{pmatrix} = \begin{pmatrix} a_x[k]^2 - a_y[k]^2 \\ 2a_x[k]a_y[k]\cos(\Delta\phi[k]) \\ 2a_x[k]a_y[k]\sin(\Delta\phi[k]) \end{pmatrix} \quad (16)$$

where:

$$\Delta\phi[k]=\phi_y[k]-\phi_x[k] \quad (17)$$

As will be understood, when mapped into the Stokes space, the signal is contained in a lens-like geometrical figure that rotates in time, which indicates that the received state of polarization is fluctuating in time. Therefore, the polarization states of transmission (i.e., Jones vector) are contained in the normal of the least-square (LS) plane to the lens-like geometrical figure.

Accordingly, in one embodiment, the mapped signal in the 3-dimensional Stokes space is assumed to follow the Gaussian mixture model. A mixture of Gaussians approximates a given probability density as:

$$p(\hat{s}) = \sum_{i=1}^{N} a_i g(\hat{s} | \mu_i, \Sigma_i) \quad (18)$$

where:
$\hat{s}$ is the 3-dimensional Stokes-space sub-vector discussed above;
N is the number of components;
$g(\hat{s}|\mu_i, \Sigma_i)$ is the $i^{th}$ component's Gaussian probability density function:

$$g(\hat{s} | \mu_i, \Sigma_i) = \frac{1}{\sqrt{(2\pi)^3|\Sigma_i|}} \exp\left[-\frac{1}{2}(\hat{s} - \mu_i)^T \Sigma_i^{-T}(\hat{s} - \mu_i)\right] \quad (19)$$

$\alpha_i$ are the Gaussian mixture weights;
$\mu_i$, $\Sigma_i$ are the mean vector and the covariance matrix of the $i^{th}$ Gaussian mixture;
the Gaussian mixture parameters ($\alpha_i$, $\mu_i$, $\Sigma_i$) can be estimated. According to one embodiment, an MFI 330 assumes that means $\mu_i$ follow a normal distribution, the covariance matrices $\Sigma_i$ follow a Wishart distribution, and the weights $\alpha_i$ follow a Dirichlet distribution. Therefore, in one embodiment, Variational Bayesian methods can be applied to approximate the Gaussian mixture parameters ($\alpha_i$, $\mu_i$, $\Sigma_i$). Each parameter $\alpha_i$, $\mu_i$, $\Sigma_i$ can be modeled by a probabilistic distribution.

As noted above, the polarization states of transmission (i.e., Jones vector) are contained in the normal of the least-square (LS) plane to the lens-like geometrical figure. To estimate the inverse of the Jones matrix, the components of which depend on the Jones vector (i.e., the polarization states of transmission), an MFI 330 may identify the polarization states of transmission in the Stokes space. The polarization states are given by the normal of the LS plane to signal as it has been mapped in Stokes space. The inverse of the Jones matrix is given by:

$$M^{-1} = \begin{pmatrix} \cos(\alpha)e^{j\frac{\Delta\varphi}{2}} & \sin(\alpha)e^{-j\frac{\Delta\varphi}{2}} \\ \sin(\alpha)e^{j\frac{\Delta\varphi}{2}} & -\cos(\alpha)e^{-j\frac{\Delta\varphi}{2}} \end{pmatrix} \quad (20)$$

where:

$$\alpha = \frac{1}{2}\arctan\left(s_1, \sqrt{s_2^2 + s_3^2}\right) \quad (21)$$

$$\Delta\varphi = \arctan(s_2, s_3) \quad (22)$$

Figure 6B:
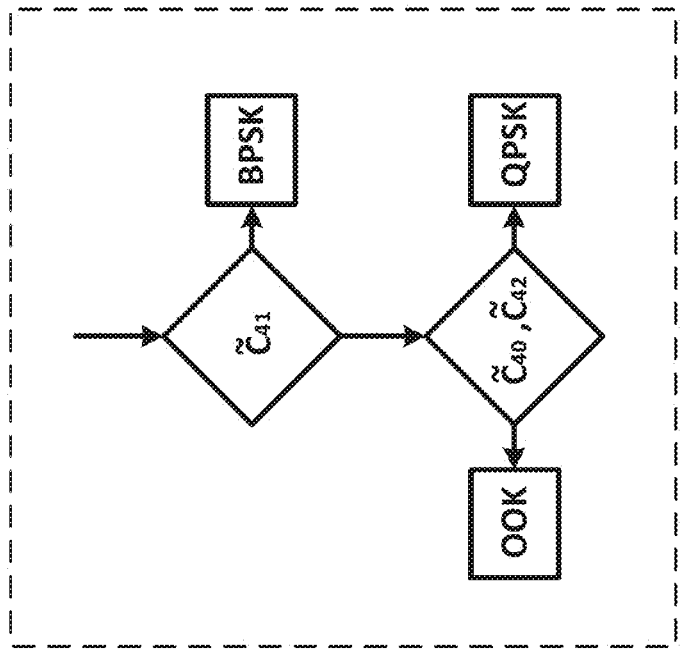
FIG. 6B illustrates a hierarchical structure for modulation format recognition using normalized fourth-order cumulants, according to an example embodiment.
Figure 6A:
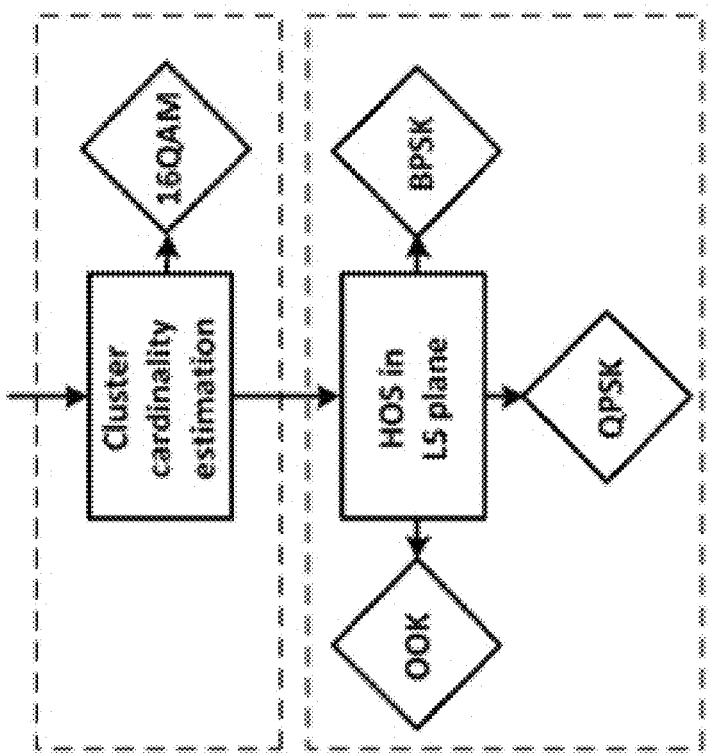
FIG. 6A is a schematic block diagram of a modulation format recognition method using Stokes space mapping, according to an example embodiment.

After the polarization states of transmission have been identified, the MFI 330 can identify the modulation formats. FIG. 6A is a schematic block diagram of the modulation format recognition method using Stokes space mapping, according to one embodiment. Modulation format distinguishability in Stokes space is possible because each format (i.e., 16QAM, OOK, BPSK, and QPSK) displays a unique signature in the Stokes space. For example, 16QAM is mapped from 16 clusters in the 2-dimensional complex plane to 60 clusters in the 3-dimensional Stokes space. BPSK is mapped from two clusters in the complex plane to two clusters in the Stokes space. Further, QPSK and OOK, while possessing radically different constellations in the complex plane, are mapped to four clusters in the Stokes-space.

As will be understood and appreciated, Stokes space mapping is sensitive to noise because it adds uncertainty in the mapping of the signal to the Stokes space, which results in imperfect clustering. Therefore, cluster identification using cluster cardinality estimation may not be a sufficient method to discriminate modulation formats in the Stokes space. But, cluster identification using cluster cardinality estimation is sufficient for distinguishing between numerous-cluster-formats and few-clusters-formats. Accordingly, in one embodiment, an MFI 330 may use cluster estimation to distinguish 16QAM from OOK, BPSK, and QPSK (i.e., numerous-cluster-formats and few-clusters-formats) in the Stokes space, as is shown in FIG. 6A.

While cluster identification using cluster cardinality estimation may allow an MFI 330 to identify the 16QAM modulation format, it is still necessary to distinguish between OOK, BPSK, and QPSK. Accordingly, in one embodiment, an MFI 330 performs cluster identification in the 3-dimensional Stokes space using a cost function based on the concentration parameters of the mixing probabilities $\alpha_i$ of the Gaussian mixture. A similar method is discussed further in R. Borkowski et al., *Optical Modulation Format Recognition in Stokes-Space for Digital Coherent Receivers*, OTH3B.3 presented at OFC/NFOEC 2013. According to one embodiment, the Gaussian mixture weights $\alpha_i$ are modeled as a joint Dirichlet distribution. Therefore, if $\{\lambda_i\}$ $N_{i=1}$ represents the concentration parameters of the Dirichlet distribution, it is possible to estimate the concentration parameters $\{\lambda_i\}$ $N_{i=1}$ of the Dirichlet distribution by applying a Variational Bayesian method.

Further, an MFI 330 can employ the normalized cost function J($N_{Cluster}$) to evaluate the probability that the considered number of cluster N cluster is exactly contained in the Stokes space among all possible number of clusters. The normalized cost function J($N_{Cluster}$) is given by:

$$J(N_{Cluster}) = \frac{j_{N_{Cluster}}}{\Sigma_{N_{Cluster}} j_{N_{Format}}} \quad (23)$$

where:

$$j_{N_{Cluster}} = \left(\frac{1}{N_{cluster}} \sum_{i=1}^{N_{Cluster}} \lambda_i\right) \Big/ \left(\frac{1}{N_{init} - N_{Cluster}} \sum_{i=N_{Cluster}+1}^{N_{init}} \lambda_i\right) \quad (24)$$

$N_{Cluster}$ is the number of clusters considered;
$N_{init}$ is the initializing number of clusters of the Variational Bayesian method Accordingly, in one embodiment, to overcome the limitation of imperfect clustering in the Stokes space, an MFI 330 employs higher-order-statistics (HOS) methods on the 2-dimensional projection of the 3-dimentional Stokes space constellation, which allows an MFI 330 to identify additional modulation formats such as OOK, BPSK, and QPSK, as is shown in FIGS. 6A & 6B. According to one embodiment, the MFI 330 projects the Stokes space data onto the least-square (LS) plane and assumes the projected Stokes space data follow the Gaussian Mixture Model. Further, in one embodiment, the MFI 330 utilizes a variational Bayesian method to estimate the mean vectors of the 2-dimensional Gaussian mixtures in the LS plane. Once each cluster has been localized, the MFI 330 utilizes a hierarchical classification scheme using HOS for recognition of the modulation format. Accordingly, FIG. 6B illustrates a hierarchical approach that utilizes normalized fourth-order cumulants to recognize modulation formats (e.g., OOK, BPSK, and QPSK) from statistics of Stokes space constellations projected onto the 2-dimensional least-square plane, in one embodiment. A similar hierarchical classification scheme is discussed further at A. Swami and B. M. Sadler, *Hierarchical Digital Modulation Classification Using Cummulants*, IEEE Trans. On commun., Vol. 48, No. 3, pp. 416-429, March 2000.

It will be appreciated that because Stokes space mapping is sensitive to noise, polarization demultiplexing performed in the Stokes space works best for signals with a high optical signal-to-noise ratio (OSNR). Accordingly, in one embodiment, after an MFI 330 determines the signal's modulation format using HOS and Stokes space mapping, a format-optimized processing module further 230 performs optimized processing with the foreknowledge of the input signal's recognized modulation format, as shown in FIG. 2 and as will be discussed herein.

Stokes Space-Based Format Recognition Using Hierarchical Classification Based on Advanced Statistical Methods There are numerous advantages for performing modulation format recognition in Stokes space. But, Stokes space mapping can be sensitive to noise, which may cause cluster expansion. Further, Stokes space constellations may be sensitive to optical fiber impairments such as polarization mode dispersion (PMD) and polarization dependent loss (PDL). Accordingly, in one embodiment, an MFI 330 may employ a hierarchical classification method based on advanced statistical methods to determine a signal's modulation format (e.g., OOK, M-QAM, M-PSK, M-PAM).

As discussed above, the least-square (LS) plane fit to the data can be used to identify and track the polarization states of the received signal. But, certain degenerated cases exist that jeopardize the identification of the transmission's polarization states. Accordingly, in such instances, prior to using any statistical tool and making decisions on the modulation format, an MFI 330 may find reliable markers in the Stokes space to track the constellation rotation with time.

In one embodiment, an MFI 330 may employ a principal component analysis (PCA) method for estimating the 2-dimensional linear plane P orthogonal to the polarization states of the received signal in order to find reliable markers in the Stokes space to track the constellation rotation with time. As will be appreciated, in Stokes space, projected clusters on plane P characteristically exhibit a maximized variance. Accordingly, by utilizing PCA, an MFI 330 may be able to search for the principal components that maximize the projected data variance. Further, because PCA is robust to noise variance, the plane Q spanned by the first two principal components typically enables the MFI 330 to better estimate the polarization states than the LS plane.

Figure 7:
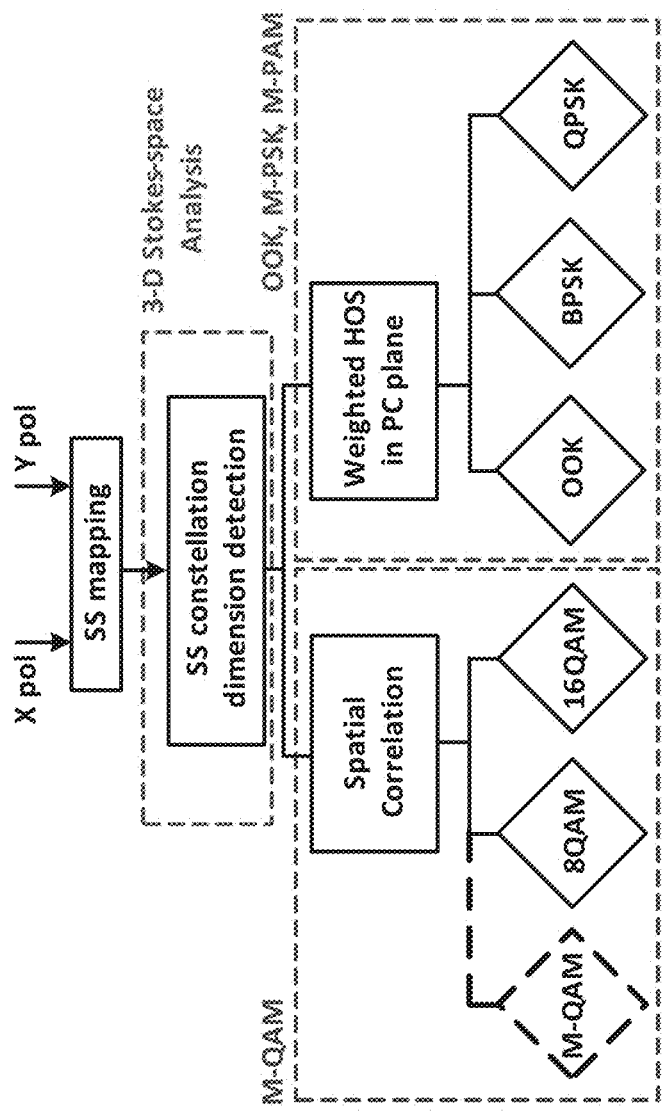
FIG. 7 is a schematic block diagram of a Stokes space-based modulation format recognition method using advanced statistical methods, according to an example embodiment.

According to one embodiment, the first step of an MFI 330 employing hierarchical classification based on advanced statistical methods is to detect the dimension of the Stokes space constellation, as shown in FIG. 7. As will be appreciated, the study of theoretical noiseless Stokes space constellations leads to a natural distinction between 2-dimensional constellations that are wholly contained on a plane in Stokes space (e.g., OOK, M-PSK, M-PAM) and 3-dimensional constellations (e.g., M-QAM with $M \neq \{2,4\}$). Assuming the cluster distribution follows a Gaussian mixture model (GMM), an MFI 330 may identify 3-dimensional Stokes space clusters parameters (i.e., mean position $\vec{\mu}$ and Dirichlet concentration parameter X) via a variational learning method such as the method discussed at C. M. Bishop, "Pattern recognition and Machine Learning", Springer $3^{rd}$ ed., 2006 and N. Nasios, et al., IEEE Trans. On Sys., Man, and Cybernetics—Part B, Vol. 36, No. 4, 2006.

In one embodiment, to detect the dimension of the Stokes space constellation, the MFI 330 defines a statistic that evaluates the weighted variance of the projected clusters' mean locations on the straight line $Q^\perp$ orthogonal to the plane Q spanned by the first two principal components. The defined statistic is represented as follows:

$$c = \Sigma_{cluster\ i} \alpha_i |<\vec{\mu}_i, \vec{s}>|^2 \qquad (25)$$

where:

$\vec{s}$ is the unitary vector of $Q^\perp$;

$\vec{\mu}_i$ is the mean position of the $i^{th}$ cluster;

$\alpha_i$ $(=\lambda_i/\Sigma_i \lambda_i)$ is the weight of the $i^{th}$ cluster.

Accordingly, for ideal noiseless Stokes space constellations, $c=0$ for OOK, M-PSK, and M-PAM. Further, $c \neq 0$ for M-QAM ($M \neq \{2,4\}$).

To discriminate between modulation formats within the 2-dimensional Stokes space constellations group (i.e., OOK, M-PSK, and M-PAM), an MFI 330 may employ a weighted HOS method on the 2-dimensional projection of the 3-dimensional Stokes space constellation. In one embodiment, 3-dimensional Stokes space data points are projected on the plane Q spanned by the first two principal components. Based on the assumption that projected clusters' distribution follows a GMM, the MFI 330 may apply a variational method to determine the clusters' parameters (i.e., mean position $\vec{\mu}_Q$ and Dirichlet concentration parameter $\lambda_Q$). The MFI 330 may then re-expresses the normalized estimates of the fourth order cumulants to take into account the detected clusters' weights (i.e., $\alpha_{Q,i}$, as defined above), which provide a reliable interpretation of the statistics of the distribution of the data projected in the Q plane. Finally, according to one embodiment, the MFI 330 employs a hierarchical classification scheme to identify the modulation format among OOK, M-PSK, and M-PAM formats.

Typically, an MFI 330 should be able to distinguish modulation formats within the M-QAM group. Accordingly, in one embodiment, an MFI 330 employs a spatial statistic based on generalized cross-product statistics such as those discussed at A. Getis, "Perspectives on Spatial Data Analysis—Advances in Spatial Science", Springer, 2010. As will be appreciated, generalized cross-product statistics are multidisciplinary tools used to evaluate spatial autocorrelation. As will be understood by one of skill in the art, spatial autocorrelation is a property possessed by mapped data whenever the mapped data exhibits an organized pattern. Put differently, spatial autocorrelation measures the correlation of a variable with itself in space. Accordingly, in one embodiment, an MFI 330 may evaluate the spatial correlation between the signal mapped into Stokes space and M-QAM-reference Stokes space constellations by defining a spatial correlation index. As will be understood, this spatial correlation index, $\Gamma_{XY}$, is based on the deviation between two sets of spatial observations X and Y. Accordingly:

$$\Gamma_{XY} = \sum\sum_{i,j} d_{i,j} \bigg/ \sum\sum_{i,j} \frac{1}{d_{i,j}} \qquad (26)$$

where $d_{i,j}$ is the Euclidian distance between spatial observations $x_i \in X$ and $y_i \in Y$.

As will be understood, spatial observations X and Y are highly correlated as the spatial correlation index $\Gamma_{XY}$ tends to 0. Therefore, in one embodiment, the identification of the particular M-QAM format is given by the minimization of the normalized correlation indexes evaluated for different reference Stokes space constellations.

As discussed above, once an MFI 330 determines the modulation format, it may then optically demodulate the received signal, in one embodiment, as will be discussed.

Figure 5:
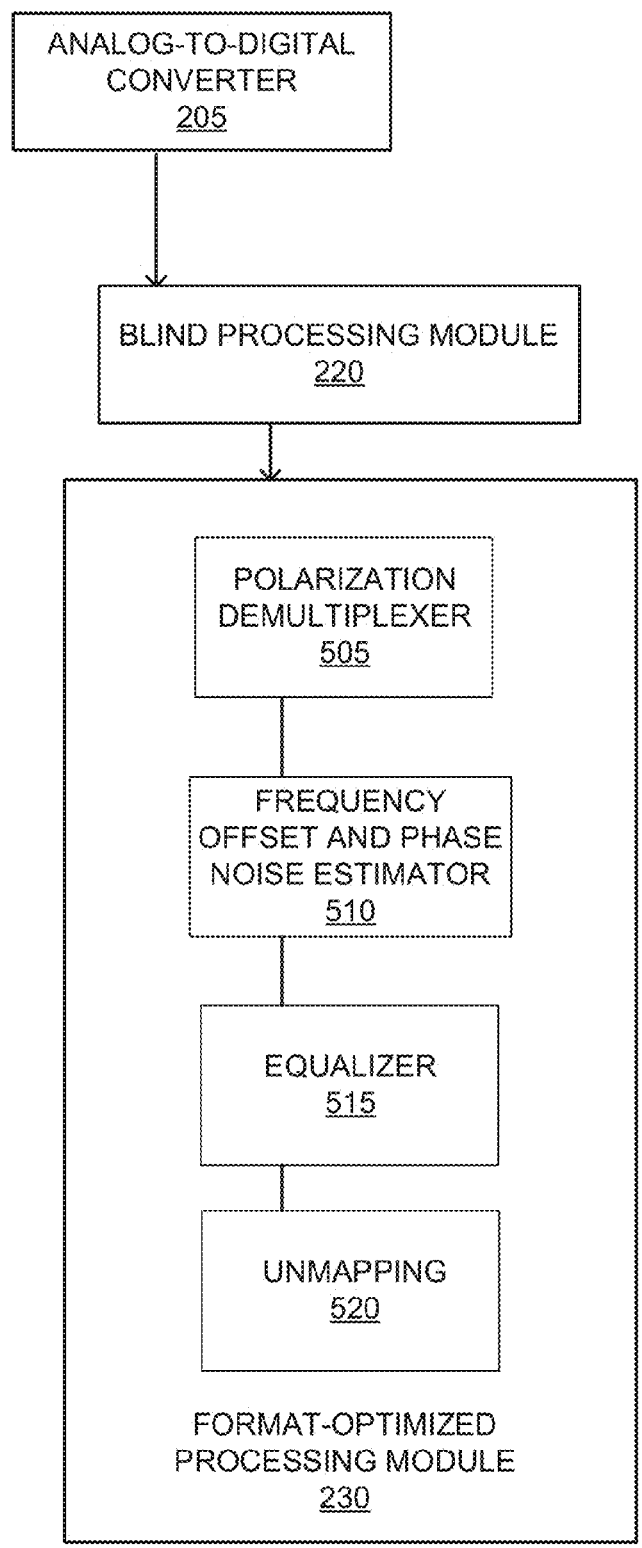
FIG. 5 is a block diagram of a format-optimized processing module 230, according to an example embodiment.

Format-Optimized Processing Module:

In one embodiment, as shown in FIG. 2, an APM 210 may comprise a format-optimized processing module 230. As shown in FIG. 5, a format-optimized processing module 230 may comprise a polarization demultiplexer 505, a frequency offset and phase noise estimator 510, an equalizer 515, and an unmapping module 520.

Polarization Demultiplexer

As shown in FIG. 5, a format-optimized processing module 230 may comprise a polarization demultiplexer 505. In one embodiment, for signals having QPSK and 16-QAM format, the polarization demultiplexer 505 may process the input signals with an independent component analysis (ICA) based polarization demultiplexing with natural gradient algorithm. Further discussion of similar methods can be found at S. Amari et. al., *Multichannel Blind Deconvolution and Equalization using Natural Gradient*, Signal Processing Advances *in Wireless Communications*, 1997 *First IEEE Signal Processing Workshop on*, vol., no., pp. 101-104, 16-18 Apr. 1997. Alternatively, for OOK and BPSK input signals, a polarization demultiplexer 505 may employ a CMA based polarization demultiplexing algorithm, as discussed above.

Frequency Offset and Phase Noise Estimator

In one embodiment, after polarization demultiplexing, a frequency offset and phase noise estimator (FOPNE) 510 may further process the input signal by performing both frequency offset estimation (as described above) and carrier phase recovery. As previously discussed, the transmitter and receiver (LO) lasers generally are not frequency locked, which leads to a residual frequency offset component $\Delta\omega$ in the input signal phase. As will be understood by one of skill in the art, this residual frequency offset component may cause the signal constellation in each polarization to rotate over time. Accordingly, in one embodiment, an FOPNE 510 processes the signal to reduce this rotation. As discussed previously, in one embodiment, the FOPNE 510 exploits the fast Fourier transform of the received signal raised to the fourth power so that the frequency offset between the transmitter and the LO laser can be estimated and removed.

To remove carrier phase components (i.e., $\phi_x[k]$ and $\phi_y[k]$) in the X and Y polarizations, a FOPNE 510 may employ a carrier phase recovery algorithm. For example, in one embodiment, the FOPNE 510 may employ a stop-and-go decision-directed algorithm. Further discussion of a similar process may be found at G. Picchi and G. Prati, *Blind Equalization and Carrier Recovery Using a 'Stop-and-Go' Decision-Directed Algorithm*, IEEE Trans. On Comm., Col. COM-35, No. 9, September 1987. In one embodiment, such an algorithm may employ a decision-directed recovery loop to estimate the carrier phase. In one embodiment, the tracking phase equation is given by:

$$\begin{cases} \phi_x[k+1] = \phi_x[k] - \mu\text{Im}\{x[k]\overline{e_x}[k]\} \\ \phi_y[k+1] = \phi_y[k] - \mu\text{Im}\{y[k]\overline{e_y}[k]\} \end{cases} \qquad (27)$$

where:

$$e_x[k] = x[k] - \alpha[k] \qquad (28)$$

with:

$\alpha[k]$ the decision.

As will be appreciated, such an algorithm effectively tracks the carrier phase instead of estimating it over a block of symbols, as in the case of the Viterbi-Viterbi algorithm described above. Further, the step-size parameter $\mu$ enables control of the tracking speed of the carrier phase.

Equalizer

In one embodiment, an equalizer 515 performs an equalization process on the signal. To correct for intersymbol interferences (ISI), the equalizer 515 may adjust the complex frequency response of the channel to minimize the ISI and other channel impairments, for example, by employing a least mean squares (LMS) based decision-directed equalizer and residual channel effects, which are applied to the received signal per polarization.

Unmapping Module

In one embodiment, an unmapping module 520 recovers bits from decoded symbols.

Verification of Embodiments

Exemplary embodiments of architectures comprising an MFI 330 employing disclosed processing methods for determining a signal's modulation format are disclosed herein to demonstrate that the architectures' proficiency in autonomously determining and decoding received signals.

Modulation Format Recognition Using Higher-Order Statistics

Figure 8:
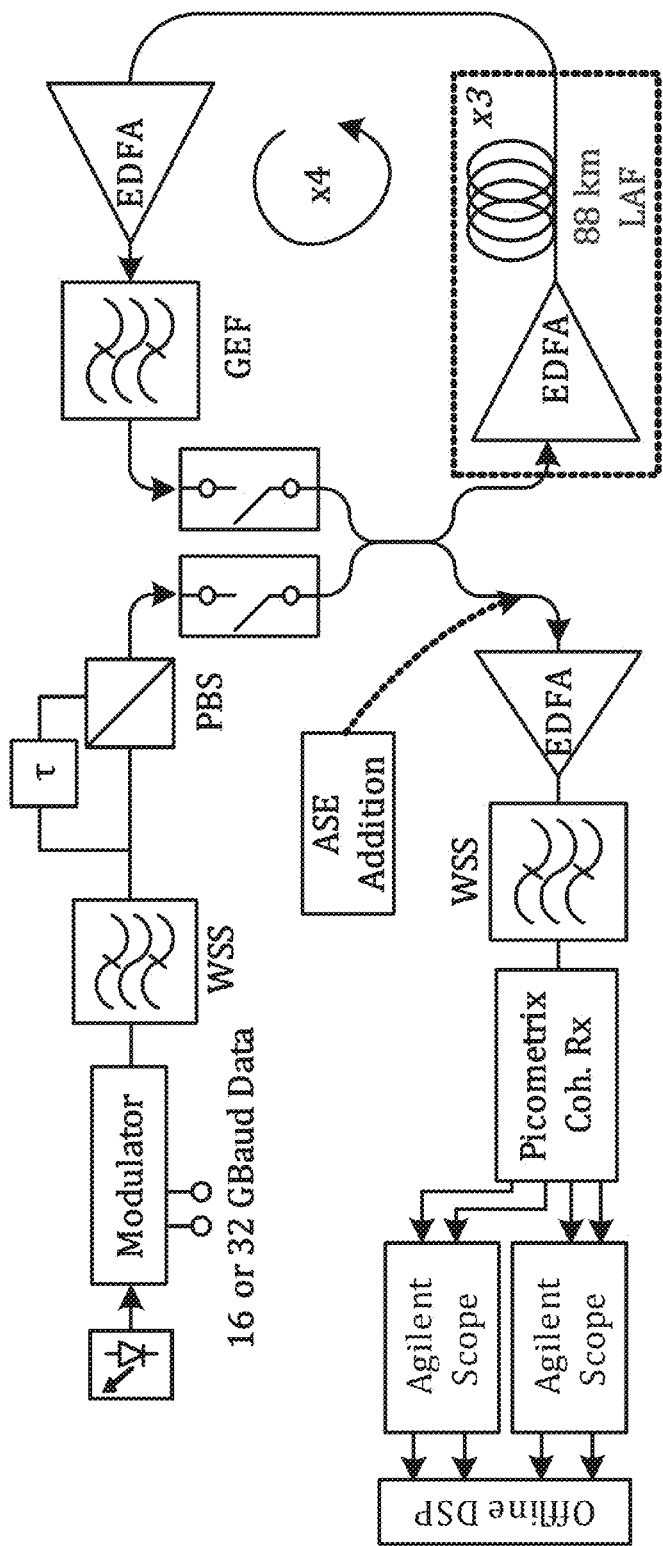
FIG. 8 is a schematic block diagram of an experimental network configuration for determining signal modulation format and demonstrating APM accuracy, according to an example embodiment.

FIG. 8 is an exemplary architecture of a test system comprising an MFI configured to employ HOS to determine a signal's modulation format and to demonstrate the accuracy of the configuration. The exemplary embodiment comprises a single transmitter, an EDFA-amplified recirculating loop comprised of 88-km large-area fiber (LAF) spans, and a Picometrix coherent receiver with outputs digitized at 80 GS/s with real-time Agilent oscilloscopes. The transmitted data comprises a conventional reference bit sequence (e.g., PRBS-15). In the exemplary embodiment, the transmitter is configured for either OOK, BPSK, QPSK, or 16QAM at 16 or 32 GBaud. All formats are passed through a 50 GHz channel filter and polarization-multiplexed before transmission. The data is circulated four times through the loop for a total transmission distance of 1056 km in all instances. The received stream of recovered bits is synchronized with a reference stream of bits for bit error rate (BER) evaluation.

Figure 9:
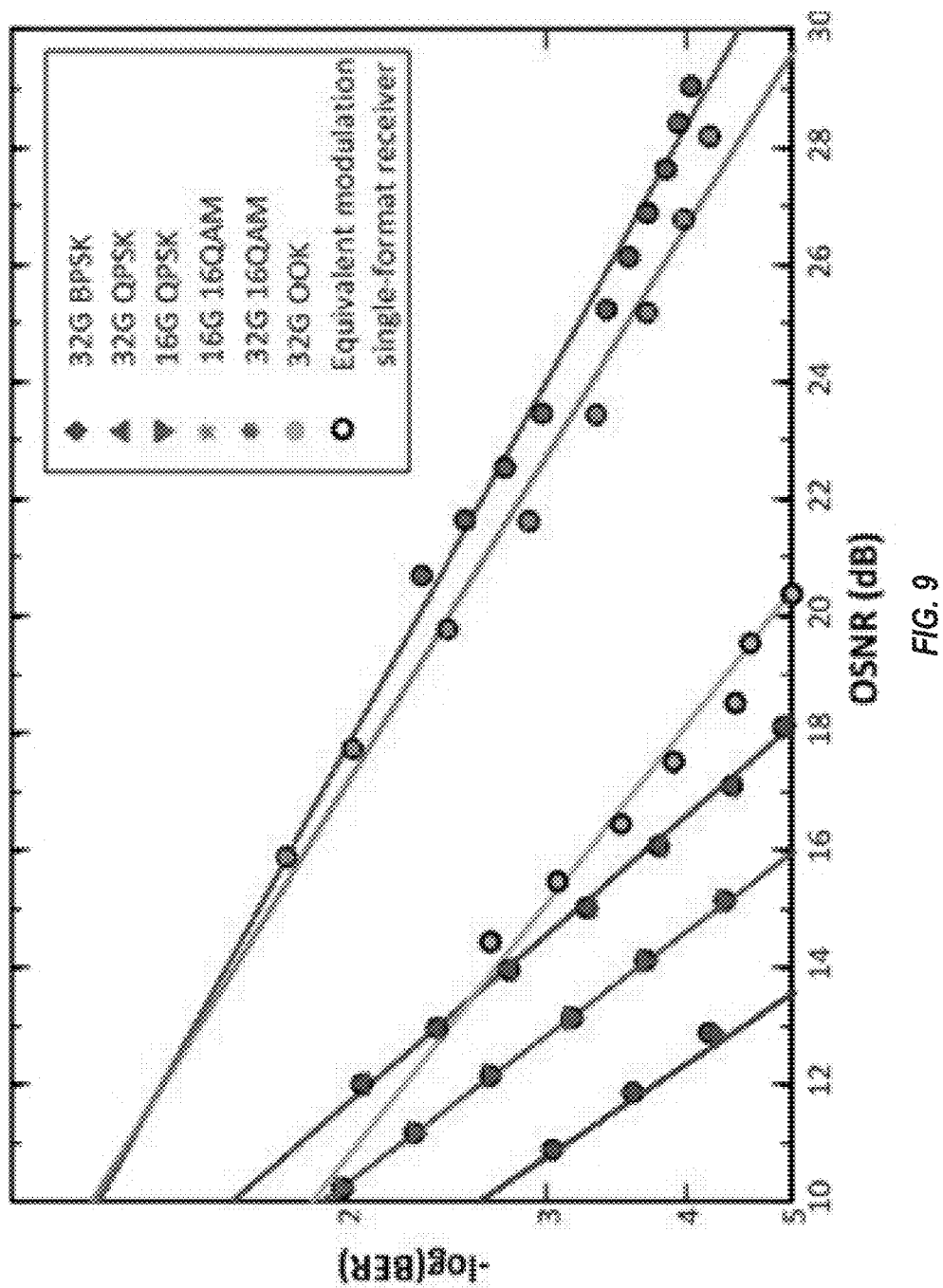
FIG. 9 illustrates BER vs. OSNR performance results of various modulation formats after blind reception, baud rate estimation, format recognition/identification using higher-order statistics, and optimized processing in a back-to-back configuration, according to an example embodiment.
Figure 10:
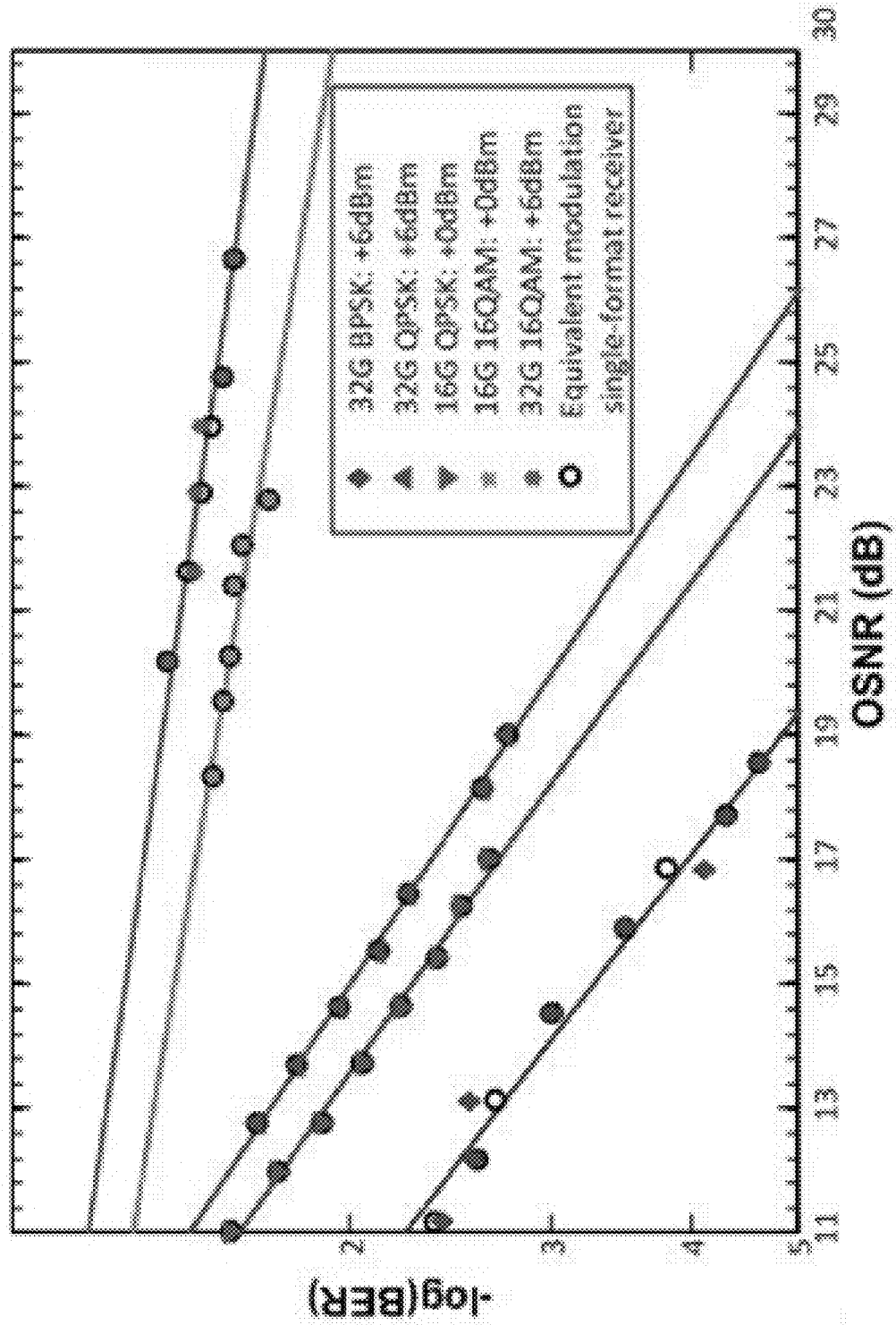
FIG. 10 illustrates BER vs. OSNR performance results of various modulation formats after blind reception, baud rate estimation, format recognition/identification using higher-order statistics, and optimized processing for a loop transmission for various input powers, according to an example embodiment.

Using the configuration as shown in FIG. 8, the BER vs. OSNR performance was evaluated before transmission (back-to-back configuration) for each modulation format, and the results are shown in FIG. 9. The FIG. 9 results illustrate the BER vs. OSNR performance of the various modulation formats after blind reception, baud rate estimation, format recognition/identification using HOS, and optimized processing in a back-to-back configuration, as discussed above. Further, using the configuration shown in FIG. 8, the BER vs. OSNR performance was evaluated after transmission in the loop for two distinct launch powers, and the results are shown in FIG. 10. The FIG. 10 results show the BER vs. OSRN performance of the various modulation formats after blind reception, baud rate estimation, format identification, and optimized processing for the loop transmission for various input powers. The results shown in FIGS. 9 and 10 illustrate that an architecture comprising an MFI employing HOS to determine a signal's modulation format is able to autonomously determine and decode OOK, BPSK, QPSK, and 16-QAM signals and exhibits negligible performance penalty compared to traditional processing methods (e.g., methods utilizing full knowledge of the signal transmission parameters) for each of the formats.

Additionally, classification performance vs. OSNR was quantified for the architecture comprising an MFI configured to deploy HOS for determining modulation format in back-to-back and after 1056 km transmission (0 or +6 dBm launch power) for OOK, BPSK, QPSK, and 16-QAM formats at 16 or 32 Gbaud. At a given OSNR, the probability of recognition for a format was determined by examining fifteen waveforms (130,000 samples each).

Figure 11:
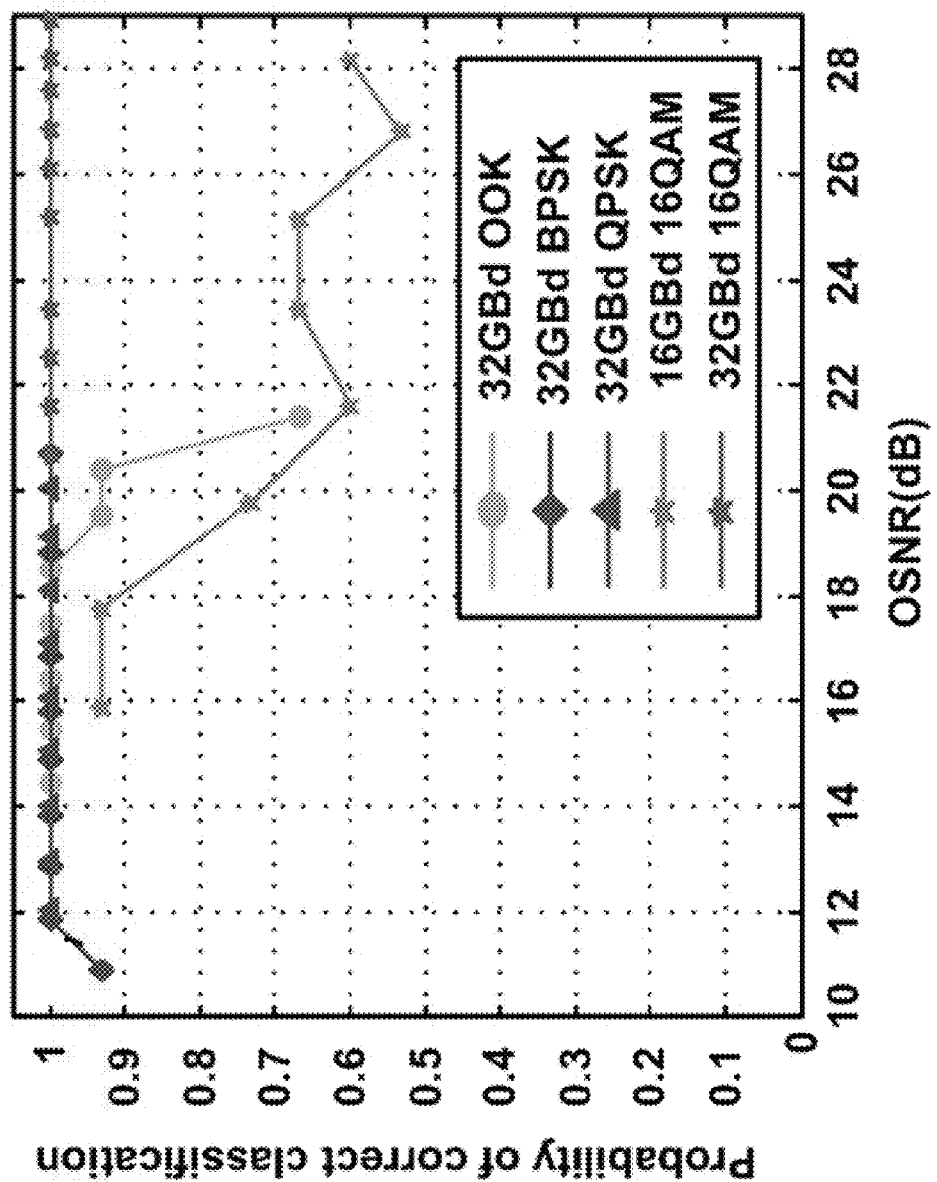
FIG. 11 illustrates classification performance vs. OSNR of various modulation formats for format recognition using higher-order statistics-based methods in a back-to-back configuration, according to one embodiment.
Figure 12:
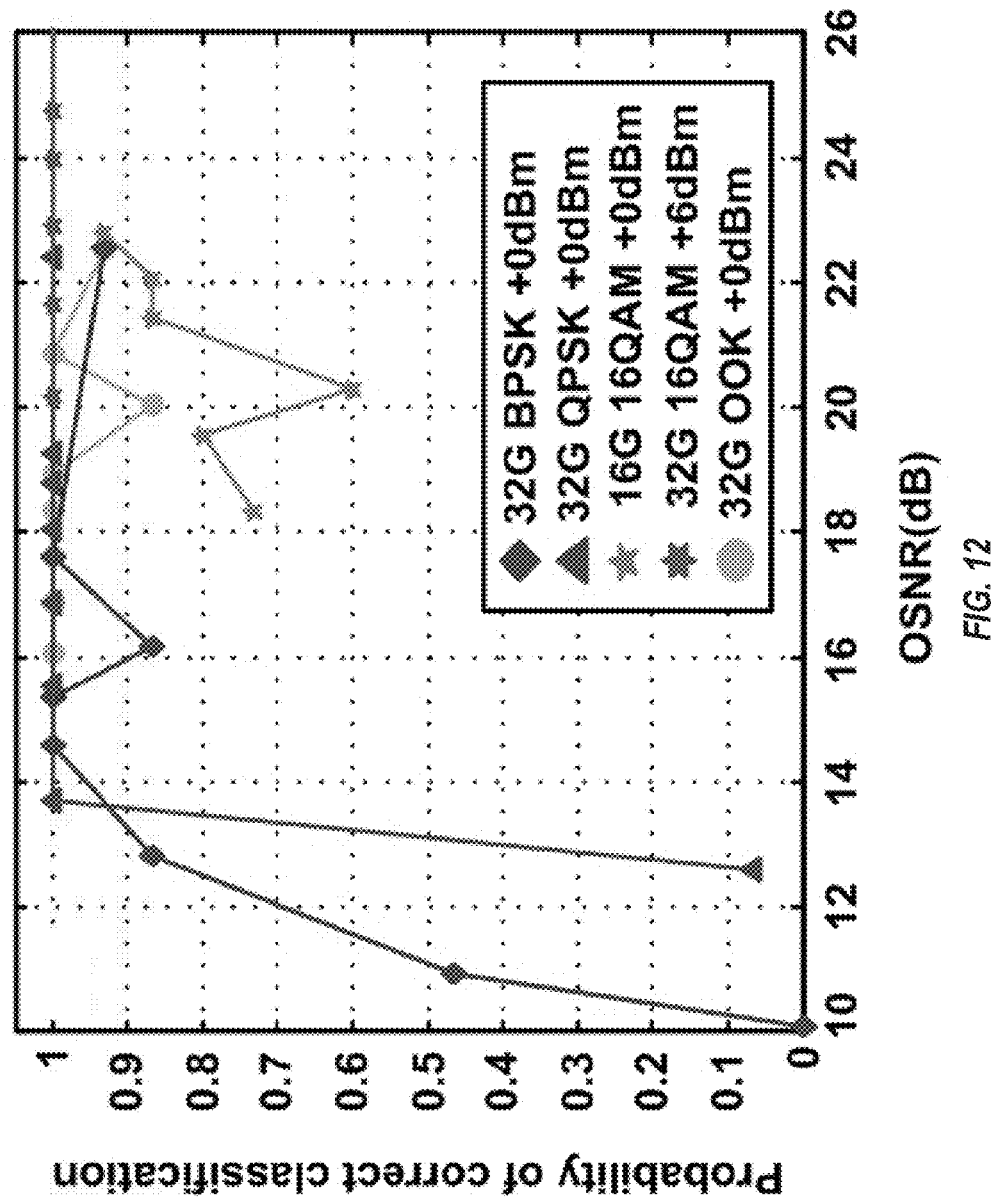
FIG. 12 illustrates classification performance vs. OSNR of various modulation formats for format recognition using higher-order statistics-based methods after 1056 km transmission for varying launch powers, according to one embodiment.

As shown in FIG. 11, the classification performance for an architecture comprising an MFI configured to deploy HOS for determining modulation format is excellent in the back-to-back configuration. As shown in FIG. 11, correct format recognition probabilities typically are above 50%. Further, as shown in FIG. 12, after 1056 km transmission in LAF, the architecture recognizes high OSNR signals.

Hybrid Modulation Format Recognition Using HOS and Stokes Space Mapping

An exemplary architecture similar to that shown in FIG. 8 served as a test system comprising an MFI configured to employ HOS and Stokes space mapping to determine a signal's modulation format and to demonstrate the accuracy of the configuration. As with the architecture discussed above, the exemplary embodiment comprises a single transmitter, an EDFA-amplified recirculating loop comprised of 88-km large-area fiber (LAF) spans, and a Picometrix coherent receiver with outputs digitized at 80 GS/s with real-time Agilent oscilloscopes. The transmitted data comprises a conventional reference bit sequence (e.g., PRBS-15). In the exemplary embodiment, the transmitter is configured for either OOK, BPSK, QPSK, or 16QAM at 16 or 32 GBaud. All formats are passed through a 50 GHz channel filter and polarization-multiplexed before transmission. The data is circulated four times through the loop for a total transmission distance of 1056 km in all instances. The received stream of recovered bits is synchronized with a reference stream of bits for bit error rate (BER) evaluation.

FIGS. 13A-D show the results of the test system comprising an MFI configured to employ HOS and Stokes space mapping to determine a signal's modulation format and to demonstrate the accuracy of the configuration. As shown in FIGS. 13A-D, when evaluating the back-to-back configuration (i.e., before transmission) for each modulation format, the exemplary test architecture comprising an MFI configured to employ HOS and Stokes space mapping for determining signal modulation format recognizes high-OSNR signals without difficulty. In particular, FIGS. 13A-D show the normalized cost-function estimated the number of clusters in Stokes space for modulation formats OOK 1310, BPSK 1312, QPSK 1314, and 16QAM 1316. Further, FIGS. 13A-D show the Stokes space constellation and the LS plane fit for modulation formats OOK 1320, BPSK 1322, QPSK 1324, and 16QAM 1326. Finally, FIGS. 13-C show the projected Stokes space constellation onto the LS plane for modulation formats OOK 1330, BPSK 1332, and OPSK 1334.

Figure 14C:
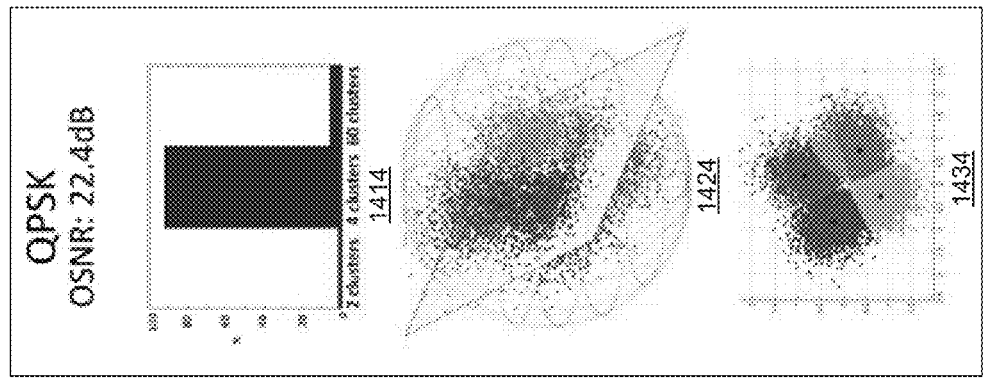
FIGS. 14A-C illustrate modulation format recognition using a test system comprising an MFI configured to employ HOS and Stokes space mapping for a loop transmission for various input powers, according to an example embodiment.
Figure 14B:
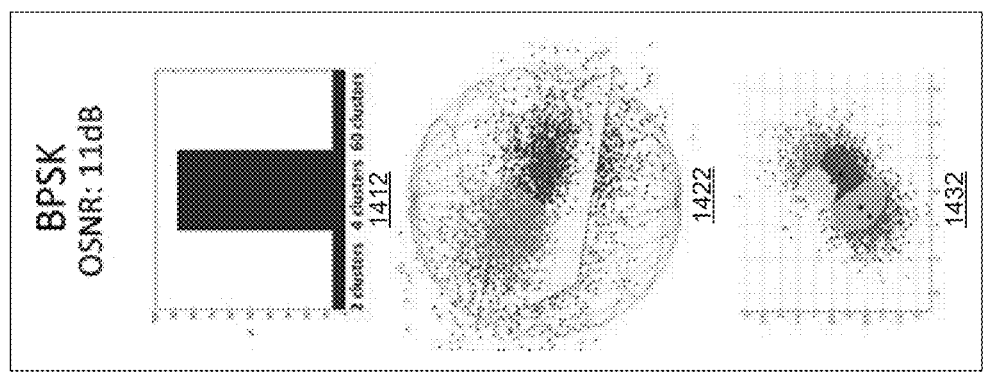
Figure 14A:
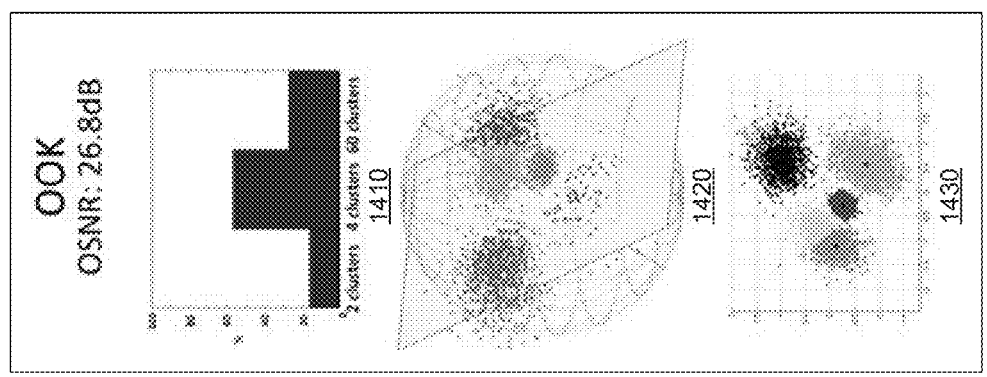

FIGS. 14A-C show the results of the test system comprising an MFI configured to employ HOS and Stokes space mapping to determine a signal's modulation format and to demonstrate the accuracy of the configuration when evaluating the signal after 1056 km transmission. As shown, the exemplary test architecture comprising an MFI configured to employ HOS and Stokes space mapping recognizes high-OSNR signals without difficulty. FIGS. 14A-C show the normalized cost-function estimating the number of clusters in the Stokes space for OOK 1410, BPSK 1412, and QPSK 1414. Further, FIGS. 14A-C show the Stokes space constellation and the LS plane fit for OOK 1420, BPSK 1422, and QPSK 1424. Finally, FIGS. 14A-C show the projected Stokes space constellations onto the LS plane for OOK 1430, BPSK 1432, and QPSK 1434.

Figure 15:
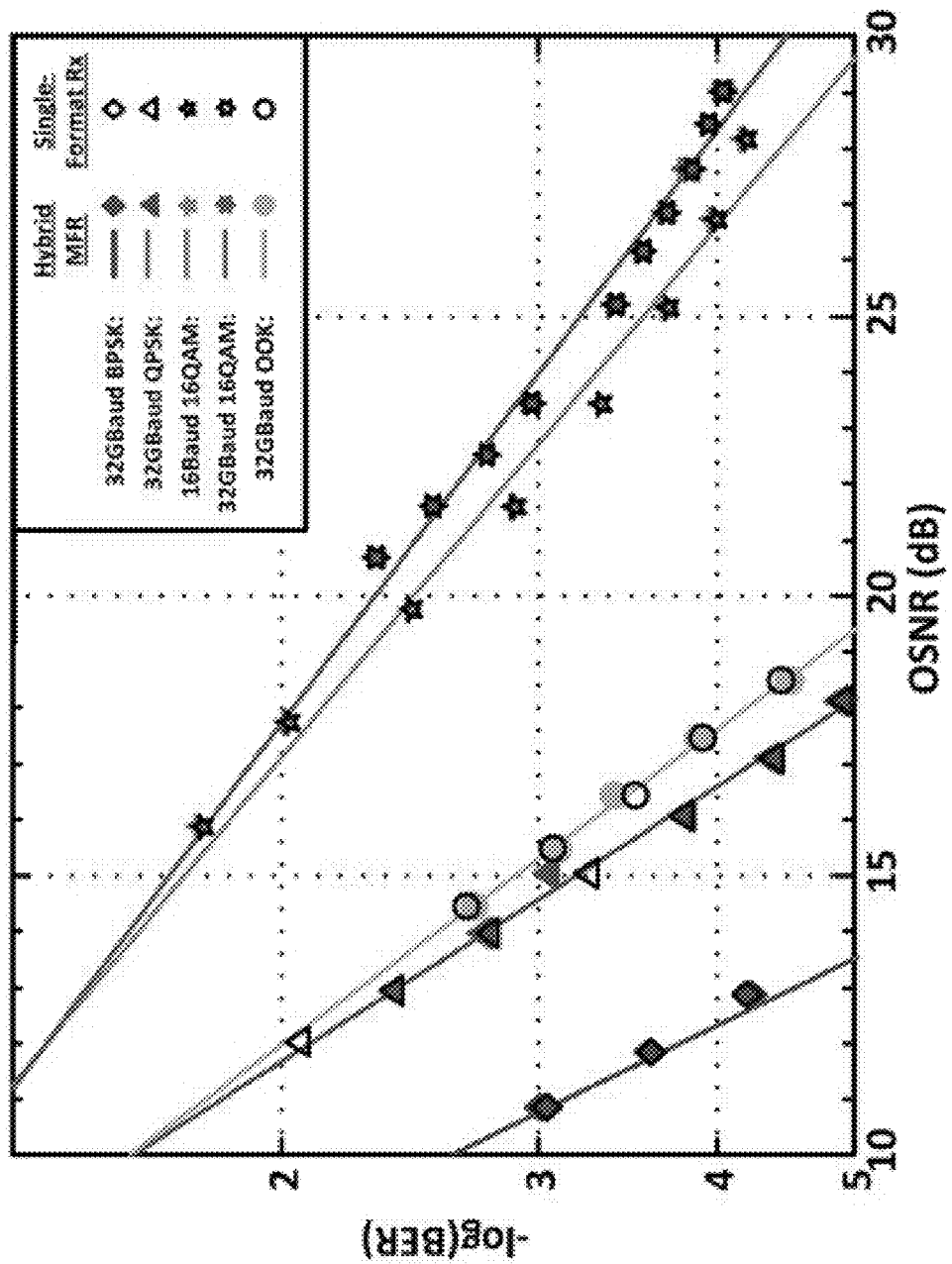
FIG. 15 illustrates BER vs. OSNR performance results of various modulation formats after blind reception, baud rate estimation, format recognition/identification using higher-order statistics and Stokes space mapping, and optimized processing in the back-to-back configuration, according to one embodiment.
Figure 16:
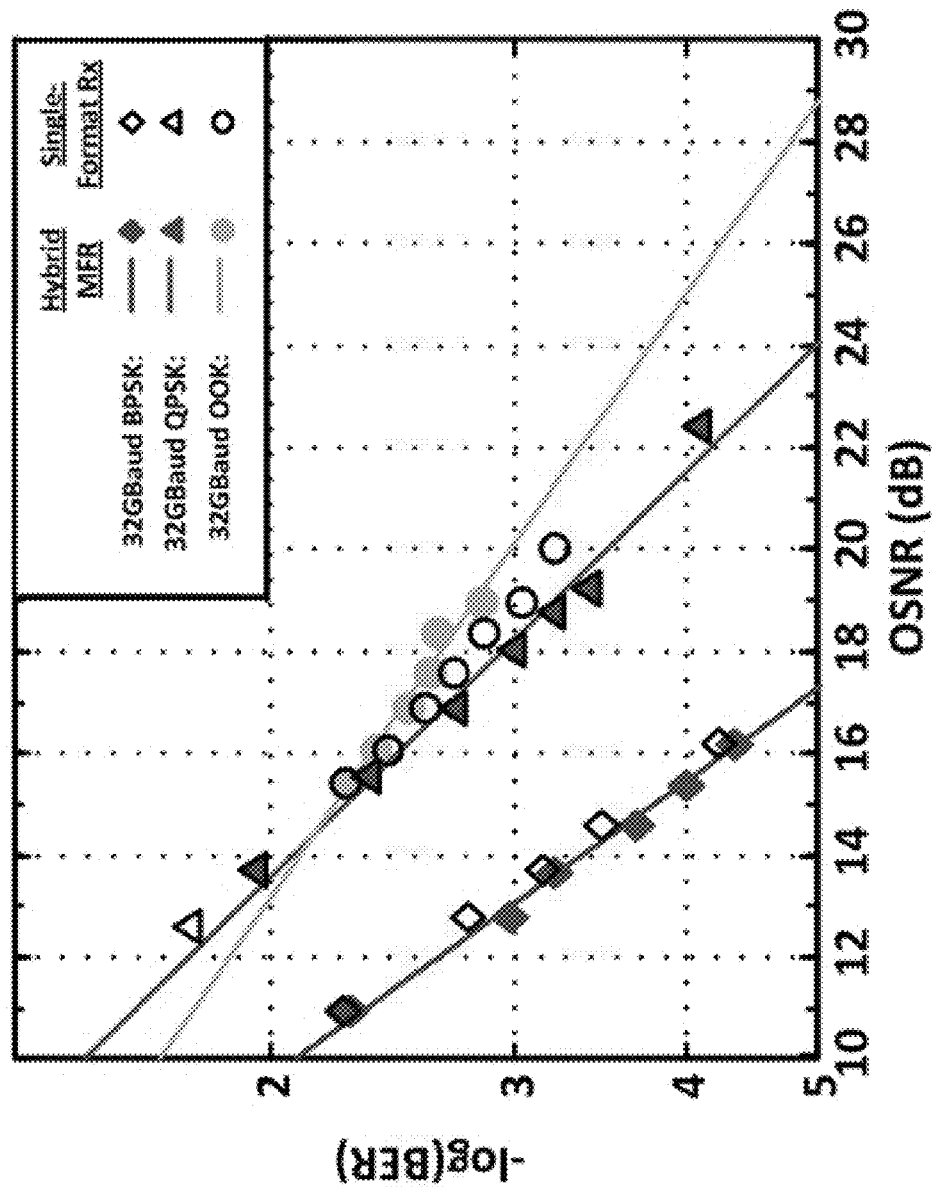
FIG. 16 illustrates BER vs. OSNR performance results of various modulation formats after blind reception, baud rate estimation, format recognition/identification using higher-order statistics and Stokes space mapping, and optimized processing for a loop transmission for various input powers, according to one embodiment.

As will be appreciated, because Stokes space mapping is very sensitive to noise, the polarization demultiplexing method performed in the Stokes space is ideal for high OSNR signals. Consequently, in one embodiment, and as discussed above, polarization demultiplexing may be performed by a polarization demux 505 in a format-optimized processing module 230 based on the recognized modulation format. Accordingly, BER vs. OSNR performance was evaluated for an MFI configured to employ HOS and Stokes space mapping both before transmission (i.e., back-to-back configuration and after transmission) for each modulation format for a 0dBm launch power. FIG. 15 shows the BER vs. OSNR performance of the various modulation formats after blind reception, baud rate estimation, format identification by an MFI configured to employ HOS and Stokes space mapping, and optimized processing in the back-to-back configuration. Similarly, FIG. 16 shows BER vs. OSNR performance of the various modulation formats after blind reception, baud rate estimation, format identification by an MIR configured to employ HOS and Stokes space mapping, and optimized processing to quantify for the loop transmission for 0dBm launch power. As is shown in FIGS. 15 and 16, an architecture comprising an MIR configured to employ HOS and Stokes space mapping is able to autonomously determine and decode OOK, BPSK, QPSK, and 16-QAM with high accuracy.

Stokes Space-Based Format Recognition Using Hierarchical Classification Based on Advanced Statistical Methods An experimental optical network was likewise designed to evaluate the robustness of an architecture comprising an MIR configured to employ a Stokes space-based model using a hierarchical classification based on advanced statistical methods. The experimental configuration comprises a single-channel system transported at 1550.92 nm with 50 GHz optical filters at the transmitter and receiver, an EDFA-amplified recirculating loop made of three 88-km large-area fiber (LAF) spans, a coherent optical receiver and two synchronized analog-to-digital converters (ADC) digitizing waveforms at 80 GSa/s. Signals are acquired after four loops for a total transmission distance of 1056 km. Classification performance vs. OSNR was quantified for the architecture in the back-to-back and after 1056 km transmission (0 or +6 dBm launch power) for OOK, BPSK, QPSK, and 16-QAM formats at 16 or 32 Gbaud. At a given OSNR, the probability of recognition for a format was determined by examining 15 waveforms comprising 130,000 samples each.

Figure 17:
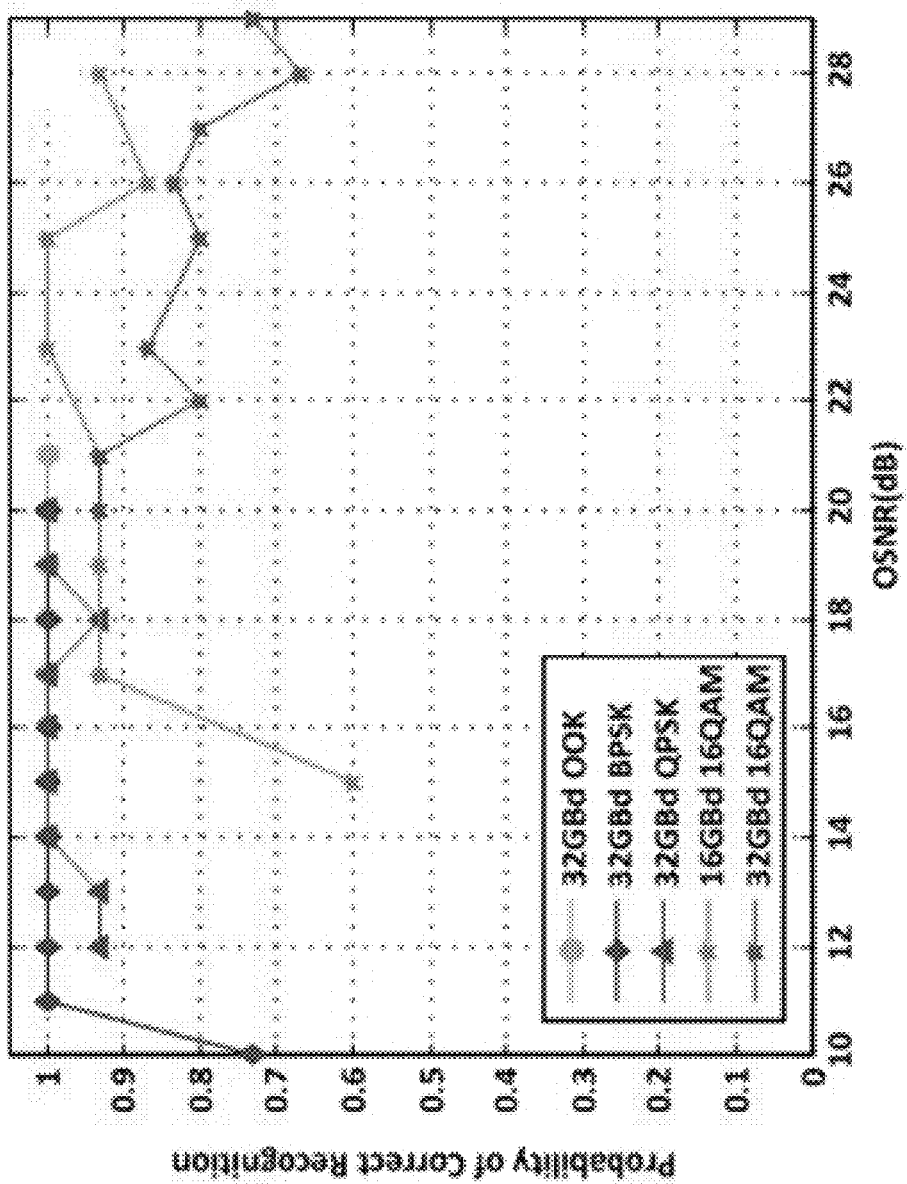
FIG. 17 illustrates classification performance vs. OSNR of various modulation formats for Stokes space-based format recognition using hierarchical classification based on advanced statistical methods in a back-to-back configuration, according to one embodiment.
Figure 18:
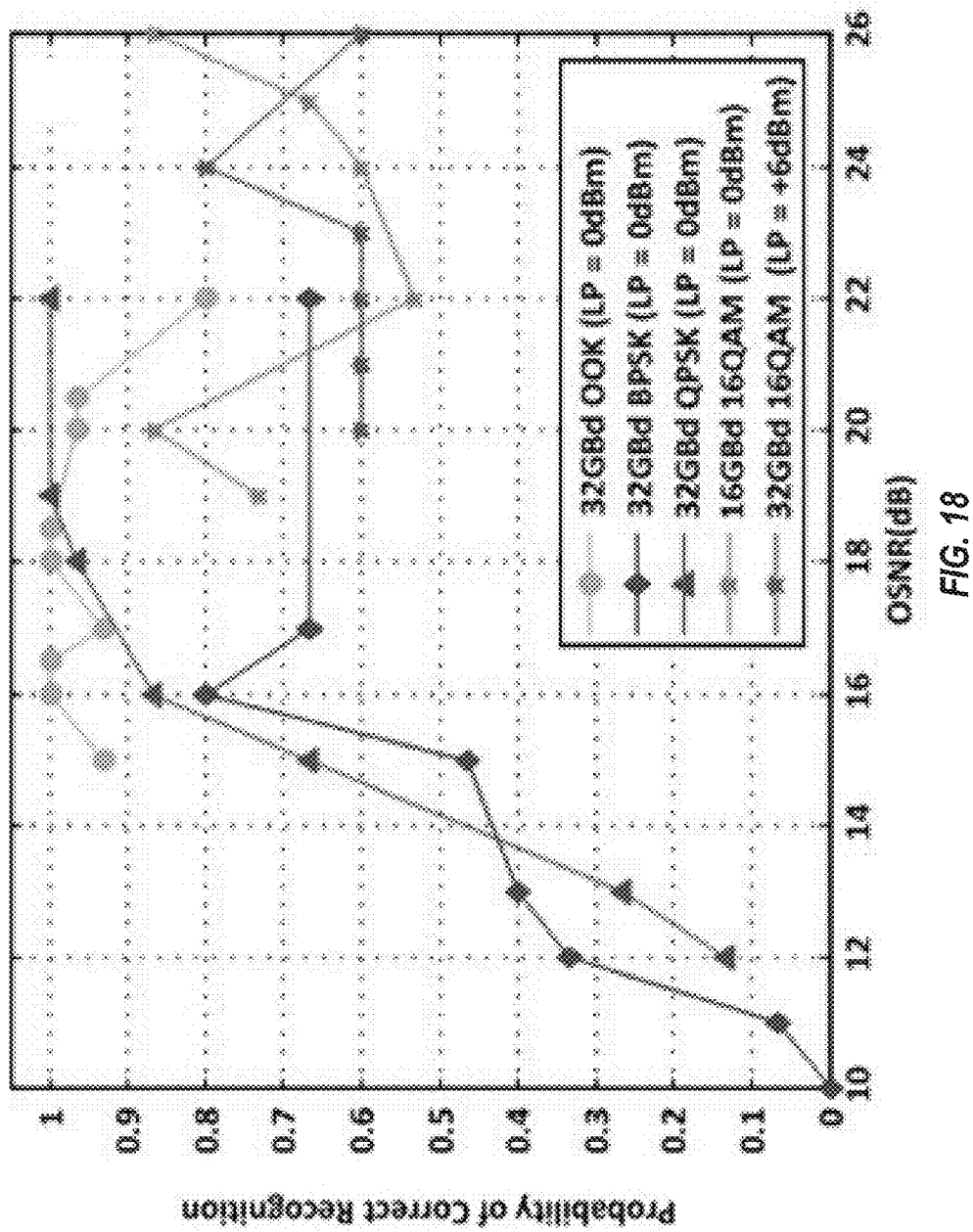
FIG. 18 illustrates classification performance vs. OSNR of various modulation formats for Stokes space-based format recognition using hierarchical classification based on advanced statistical methods after 1056 km transmission for varying launch powers, according to one embodiment.

As shown in FIG. 17, the classification performance for the Stokes space-based format recognition using hierarchical classification based on advanced statistical methods is excellent in a back-to-back configuration. As shown in FIG. 17, for the large range of investigated OSNR, correct format recognition probabilities are typically above 60%. Further, as shown in FIG. 18, after 1056 km transmission in LAF, the architecture recognizes high OSNR signals. Further, once the formats are identified, the signals are demodulated with a BER performance indistinguishable from an omniscient receiver with maximum foreknowledge of the signal's parameters.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person of ordinary skill to practice certain embodiments of the disclosed technology, including making and using any devices or systems and performing any incorporated methods. The patentable scope of certain embodiments of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method for autonomously determining the modulation format of an input signal received at a receiver from a transmitter, the method comprising:

processing the input signal to generate a plurality of estimates of a state of polarization of the input signal;

responsive to generating the plurality of estimates of the state of polarization of the input signal, performing polarization scrambling mitigation on the input signal to generate a plurality of polarization demultiplexed signals;

estimating a frequency offset of each of the plurality of polarization demultiplexed signals, the frequency offset being between the transmitter and a local oscillator of the receiver;

responsive to estimating the frequency offset of each of the plurality of polarization demultiplexed signals, removing the estimated frequency offset of each of the plurality of polarization demultiplexed signals to generate a plurality of frequency offset-compensated signals;

estimating a phase offset of each of the plurality of frequency offset-compensated signals, the phase offset being between the transmitter and the local oscillator of the receiver;

responsive to estimating the phase offset of each of the plurality of frequency offset-compensated signals, removing the estimated phase offset of each of the plurality of frequency offset-compensated signals to generate a plurality of phase noise-compensated signals; and calculating fourth-order cumulant values of each of the plurality of phase noise compensated signals by applying higher-order statistics to each of the plurality of phase noise-compensated signals; and responsive to calculating the fourth-order cumulant values, employing a decision tree to identify, from the list comprising OOK, BPSK, QPSK, and 16-QAM, the modulation format of the input signal.

2. The method of claim 1, wherein fourth-order cumulant values are indicative of respective particular modulation format signatures.

3. The method of claim 1, wherein processing the input signal to generate a plurality of estimates of the state of polarization of the input signal comprises operating a cross correlation between the input signal's X and Y polarizations.

4. A method comprising:
autonomously determining an input signal's baud rate with a processing medium, wherein autonomously determining the baud rate of the input signal comprises:
performing coarse estimation of the input signal's chromatic dispersion;
compensating the coarsely estimated chromatic dispersion of the input signal; and
processing the input signal with a weighted baud rate estimator;
after determining the baud rate of the input signal:
further compensating the input signal's chromatic dispersion (CD) with the processing medium to generate a CD-compensated signal; and
performing timing recovery on the CD-compensated signal with the processing medium to generate a timing-recovered signal;
processing the timing-recovered signal with the processing medium to (i) determine a number of multiplexed polarizations of the input signal and (ii) generate a plurality of estimates of the input signal's state of polarization;
responsive to generating the plurality of estimates of the input signal's state of polarization, performing polarization scrambling mitigation on the timing-recovered signal to generate a plurality of polarization demultiplexed signals; and
processing the plurality of polarization demultiplexed signals, with the processing medium, to obtain higher-order cumulants to identify the input signal's modulation format from among 16QAM, BPSK, QPSK and OOK.

5. The method of claim 4, wherein identifying the modulation format of the input signal by processing the timing-recovered signal to obtain higher-order cumulants further comprises:
processing the timing-recovered signal to provide a plurality of phase noise-compensated signals; and
applying fourth-order statistics to each of the plurality of phase noise-compensated signals to identify, from the list comprising OOK, BPSK, QPSK, and 16-QAM, the modulation format of the input signal.

6. The method of claim 4, wherein the weighted baud rate estimator is given by $$\hat{S}_\tau^{(a)} = \Gamma(\alpha)^{-1/2} \hat{R}_\tau^{(a)}.$$

7. The method of claim 4 further comprising:
responsive to determining the modulation format of the input signal, performing format-optimized demodulation on the input signal with the processing medium, wherein performing optimized demodulation on the input signal comprises:
performing optimized polarization demultiplexing on the input signal based on the identified modulation format of the input signal;
removing the input signal's frequency offset based on the identified modulation format of the input signal;
removing the input signal's phase offset based on the identified modulation format of the input signal; and
correcting one or more instances of intersymbol interference associated with the input signal.

8. The method of claim 4, wherein the input signal is received at a receiver from a transmitter, and wherein identifying the modulation format of the input signal by processing the plurality of polarization demultiplexed signals to obtain higher-order cumulants further comprises:
estimating a frequency offset of each of the plurality of polarization demultiplexed signals, the frequency offset being between the transmitter and a local oscillator of the receiver;
responsive to estimating the frequency offset of each of the plurality of polarization demultiplexed signals, removing the estimated frequency offset of each of the plurality of polarization demultiplexed signals to generate a plurality of frequency offset-compensated signals;
estimating a phase offset of each of the plurality of frequency offset-compensated signals, the phase offset being between the transmitter and the local oscillator of the receiver;
responsive to estimating the phase offset of each of the plurality of frequency offset-compensated signals, removing the estimated phase offset of each of the plurality of frequency offset-compensated signals to generate a plurality of phase noise-compensated signals; and
applying higher-order statistics to each of the plurality of phase noise-compensated signals to identify, from the list comprising OOK, BPSK, QPSK, 16-QAM, and M-QAM, the modulation format of the input signal.

9. The method of claim 8, wherein applying higher-order statistics to each of the plurality of phase noise-compensated signals comprises:
calculating fourth-order cumulant values of each of the plurality of phase noise-compensated signals by applying higher-order statistics to each of the plurality of phase noise-compensated signals, wherein higher-order cumulant values are indicative of respective particular modulation format signatures; and
responsive to calculating the fourth-order cumulant values, employing a decision tree to identify the modulation format of the input signal.

10. A method for autonomous modulation format identification comprising:
blindly receiving, at a receiver and from a transmitter, a signal, wherein the receiver comprises a conversion medium and a signal processing medium;
processing the received signal with the conversion medium to generate an input signal;
transmitting the input signal to the signal processing medium for autonomous signal modulation format identification, wherein autonomous signal modulation format identification comprises:

determining the baud rate of the input signal to define
the signal's symbol boundaries in time;
after determining the baud rate of the input signal:
compensating the input signal's chromatic dispersion (CD) to generate a CD-compensated signal; and
performing timing recovery on the CD-compensated signal to generate a timing-recovered signal;
processing the timing-recovered signal to determine a number of multiplexed polarizations of the input signal;
responsive to determining that the number of multiplexed polarizations of the input signal is greater than one, performing blind polarization demultiplexing, blind polarization demultiplexing comprising:
processing the timing-recovered signal to generate a plurality of estimates of the input signal's state of polarization;
responsive to generating the plurality of estimates of the input signal's state of polarization, performing polarization scrambling mitigation on the timing-recovered signal to generate a plurality of polarization demultiplexed signals;
estimating a frequency offset of each of the plurality of polarization demultiplexed signals, the frequency offset being between the transmitter and a local oscillator of the receiver;
responsive to estimating the frequency offset of each of the plurality of polarization demultiplexed signals, removing the estimated frequency offset of each of the plurality of polarization demultiplexed signals to generate a plurality of frequency offset-compensated signals;
estimating a phase offset of each of the plurality of frequency offset-compensated signals, the phase offset being between the transmitter and the local oscillator of the receiver;
responsive to estimating the phase offset of each of the plurality of frequency offset-compensated signals, removing the estimated phase offset of each of the plurality of frequency offset-compensated signals to generate a plurality of phase noise-compensated signals; and
responsive to performing blind polarization demultiplexing, calculating fourth-order cumulant values of each of the plurality of phase noise-compensated signals by applying higher-order statistics to each of the plurality of phase noise-compensated signals; and
responsive to calculating the fourth-order cumulant values, employing a decision tree that incorporates appropriate fourth-order cumulant values to identify, from the group comprising OOK, BPSK, QPSK, and 16-QAM, the modulation format of the input signal.

11. The method of claim 10, further comprising:
responsive to determining the modulation format of the input signal, optimally demodulating the input signal with the signal processing medium.

12. The method of claim 10, wherein
fourth-order cumulant values are indicative of respective particular modulation format signatures.

13. A system comprising:
a receiver comprising a local oscillator;
one or more processors;
a memory coupled to the one or more processors and storing instructions that, when executed by the one or more processors, cause the system to:
autonomously determine an input signal's baud rate to define the input signal's symbol boundaries in time, the input signal received from a transmitter;
after determining the baud rate of the input signal:
compensate the input signal's chromatic dispersion (CD) to generate a CD-compensated signal; and
perform timing recovery on the CD-compensated signal to generate a timing-recovered signal;
process the timing-recovered signal to determine a number of multiplexed polarizations of the input signal; and
responsive to determining the number of multiplexed polarizations of the input signal, process the timing-recovered signal to obtain higher-order cumulants to identify the input signal's modulation format from among 16QAM, BPSK, QPSK and OOK.

14. The system of claim 13, wherein identifying the modulation format of the input signal by processing the timing-recovered signal to obtain higher-order cumulants comprises:
processing the timing-recovered signal to provide a plurality of phase noise-compensated signals; and
applying fourth-order statistics to each of the plurality of phase noise-compensated signals to identify, from the list comprising OOK, BPSK, QPSK, and 16-QAM, the modulation format of the input signal.

15. The system of claim 13, wherein identifying the modulation format of the input signal by processing the timing-recovered signal to obtain higher-order cumulants comprises:
processing the timing-recovered signal to generate a plurality of estimates of the input signal's state of polarization;
responsive to generating the plurality of estimates of the input signal's state of polarization, performing polarization scrambling mitigation on the timing-recovered signal to generate a plurality of polarization demultiplexed signals;
estimating a frequency offset of each of the plurality of polarization demultiplexed signals, the frequency offset being between the transmitter and the local oscillator of the receiver;
responsive to estimating the frequency offset of each of the plurality of polarization demultiplexed signals, removing the estimated frequency offset of each of the plurality of polarization demultiplexed signals to generate a plurality of frequency offset-compensated signals;
estimating a phase offset of each of the plurality of frequency offset-compensated signals, the phase offset being between the transmitter and the local oscillator of the receiver;
responsive to estimating the phase offset of each of the plurality of frequency offset-compensated signals, removing the estimated phase offset of each of the plurality of frequency offset-compensated signals to generate a plurality of phase noise-compensated signals; and
applying higher-order statistics to each of the plurality of phase noise-compensated signals to identify, from the list comprising OOK, BPSK, QPSK, and 16-QAM, the modulation format of the input signal.

* * * * *